United States Patent
Park et al.

(10) Patent No.: US 9,959,107 B2
(45) Date of Patent: May 1, 2018

(54) METHOD AND APPARATUS FOR UPDATING APPLICATION

(71) Applicant: Samsung Electronics Co., Ltd., Gyeonggi-do (KR)

(72) Inventors: Sunmin Park, Seoul (KR); Sangho Kim, Gyeonggi-do (KR); Boseok Moon, Gyeonggi-do (KR); Jaehyun Park, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 33 days.

(21) Appl. No.: 14/319,935

(22) Filed: Jun. 30, 2014

(65) Prior Publication Data
US 2015/0007157 A1 Jan. 1, 2015

(30) Foreign Application Priority Data
Jun. 28, 2013 (KR) .................. 10-2013-0075239

(51) Int. Cl.
G06F 8/65 (2018.01)
G06F 9/445 (2018.01)
H04M 1/725 (2006.01)

(52) U.S. Cl.
CPC ........... G06F 8/65 (2013.01); *H04M 1/72525* (2013.01)

(58) Field of Classification Search
CPC .............................................. G06F 8/60–8/68
See application file for complete search history.

(56) References Cited

U.S. PATENT DOCUMENTS

| | | | | | |
|---|---|---|---|---|---|
| 5,907,617 A | * | 5/1999 | Ronning | ............... | G06F 21/121 705/52 |
| 6,049,671 A | * | 4/2000 | Slivka | ....................... | G06F 8/65 717/173 |
| 6,167,567 A | * | 12/2000 | Chiles | .................. | G06F 9/4448 709/221 |
| 6,738,801 B1 | * | 5/2004 | Kawaguchi | ............... | G06F 8/65 709/208 |
| 6,820,259 B1 | * | 11/2004 | Kawamata | ................. | G06F 8/61 717/173 |
| 6,976,062 B1 | * | 12/2005 | Denby | ...................... | G06F 8/65 709/203 |

(Continued)

FOREIGN PATENT DOCUMENTS

| | | |
|---|---|---|
| KR | 10-1083189 | 11/2011 |
| KR | 1020130022488 | 3/2013 |
| KR | 1020130066421 | 6/2013 |

OTHER PUBLICATIONS

"Android 2.3.4 User's Guide", Android Mobile Technology Platform 2.3.4, XP055178792, May 20, 2011, 17 pages.

(Continued)

*Primary Examiner* — Tuan Q. Dam
*Assistant Examiner* — Zheng Wei
(74) *Attorney, Agent, or Firm* — The Farrell Law Firm, P.C.

(57) ABSTRACT

A method and an apparatus for updating an application are provided. An electronic device activates an automatic update of an installed application, designates the application as one group of one or more groups distinguished according to an update period. The electronic device controls to update the application after a time point of an update period corresponding to the designated group.

18 Claims, 22 Drawing Sheets

(56) References Cited

U.S. PATENT DOCUMENTS

| | | | | |
|---|---|---|---|---|
| 6,990,656 B2* | 1/2006 | Ersek | G06F 9/44505 | 707/E17.005 |
| 7,376,870 B2* | 5/2008 | Kataria | G06F 8/65 | 714/3 |
| 7,555,551 B1* | 6/2009 | McCorkendale | G06F 8/65 | 709/225 |
| 7,584,467 B2* | 9/2009 | Wickham | G06F 8/65 | 717/171 |
| 7,730,475 B2* | 6/2010 | Ersek | G06F 9/44505 | 717/113 |
| 7,765,538 B2* | 7/2010 | Zweifel | G06F 8/65 | 717/168 |
| 7,770,165 B2* | 8/2010 | Olson | G06F 8/68 | 709/203 |
| 7,904,608 B2* | 3/2011 | Price | G06F 8/65 | 710/10 |
| 7,971,215 B1* | 6/2011 | Strasman | H04N 21/434 | 375/240.25 |
| 8,010,991 B2* | 8/2011 | Sarukkai | G06F 21/6218 | 726/1 |
| 8,074,213 B1* | 12/2011 | Holtz | G06F 9/445 | 717/172 |
| 8,266,260 B2* | 9/2012 | Pathak | G06F 8/65 | 709/219 |
| 8,271,971 B2* | 9/2012 | Thayer | G06F 8/65 | 717/167 |
| 8,516,477 B1* | 8/2013 | Kearns | G06F 8/65 | 717/174 |
| 8,677,343 B2* | 3/2014 | Averbuch | G06F 8/665 | 717/170 |
| 8,707,292 B2* | 4/2014 | Little | G06F 8/65 | 717/172 |
| 8,713,535 B2* | 4/2014 | Malhotra | G06F 15/173 | 717/126 |
| 8,776,068 B2* | 7/2014 | Ax | G06F 9/445 | 705/1.1 |
| 8,819,661 B2* | 8/2014 | Kakos | G06F 8/65 | 717/168 |
| 8,819,662 B2* | 8/2014 | Aoyagi | G06F 8/65 | 717/168 |
| 8,819,703 B2* | 8/2014 | Pasupathilingam | G06F 9/4443 | 709/204 |
| 8,875,123 B2* | 10/2014 | Shiba | G06F 8/65 | 717/173 |
| 8,910,140 B1* | 12/2014 | Giannini | G06F 8/65 | 717/168 |
| 9,069,554 B2* | 6/2015 | Lioy | G06F 9/4893 | |
| 9,075,993 B2* | 7/2015 | Bhargava | G06F 21/56 | |
| 9,112,891 B2* | 8/2015 | Pathak | G06F 8/65 | |
| 2004/0002982 A1* | 1/2004 | Ersek | G06F 9/44505 | |
| 2004/0010786 A1 | 1/2004 | Cool et al. | | |
| 2004/0024917 A1* | 2/2004 | Kennedy | G06F 9/4406 | 710/1 |
| 2004/0031029 A1* | 2/2004 | Lee | G06F 8/65 | 717/171 |
| 2004/0103411 A1* | 5/2004 | Thayer | G06F 8/65 | 717/171 |
| 2004/0147253 A1* | 7/2004 | Fukuzato | G06F 8/61 | 455/418 |
| 2004/0187103 A1* | 9/2004 | Wickham | G06F 8/65 | 717/168 |
| 2004/0210893 A1* | 10/2004 | Chamberlain | G06F 8/65 | 717/168 |
| 2005/0050538 A1* | 3/2005 | Kawamata | G06F 8/61 | 717/168 |
| 2005/0066019 A1* | 3/2005 | Egan | G06F 8/65 | 709/223 |
| 2005/0203968 A1* | 9/2005 | Dehghan | G06F 8/65 | |
| 2005/0210459 A1* | 9/2005 | Henderson | G06F 8/65 | 717/168 |
| 2005/0228798 A1* | 10/2005 | Shepard | H04L 67/34 | |
| 2006/0020943 A1* | 1/2006 | Boutcher | G06F 9/5077 | 718/104 |
| 2006/0037014 A1* | 2/2006 | Ersek | G06F 9/44505 | 717/168 |
| 2006/0053416 A1* | 3/2006 | Watanabe | G06F 9/44557 | 717/151 |
| 2006/0059481 A1* | 3/2006 | Smith | G06F 8/65 | 717/173 |
| 2006/0075276 A1* | 4/2006 | Kataria | G06F 8/65 | 714/47.1 |
| 2006/0080656 A1* | 4/2006 | Cain | G06F 8/65 | 717/174 |
| 2006/0101457 A1* | 5/2006 | Zweifel | G06F 8/65 | 717/174 |
| 2006/0106806 A1* | 5/2006 | Sperling | G06F 8/65 | |
| 2006/0106826 A1* | 5/2006 | Butt | G06F 8/65 | |
| 2006/0168574 A1* | 7/2006 | Giannini | G06F 8/65 | 717/168 |
| 2007/0021116 A1* | 1/2007 | Okita | G06F 8/65 | 455/428 |
| 2007/0169081 A1* | 7/2007 | Zhao | G06F 8/65 | 717/168 |
| 2007/0188507 A1* | 8/2007 | Mannen | G06F 3/0607 | 345/532 |
| 2007/0192763 A1* | 8/2007 | Helvick | G06F 8/65 | 717/168 |
| 2007/0250370 A1* | 10/2007 | Partridge | G06Q 10/063112 | 705/7.14 |
| 2007/0256069 A1* | 11/2007 | Blackman | G06F 8/433 | 717/170 |
| 2008/0052698 A1* | 2/2008 | Olson | G06F 8/68 | 717/168 |
| 2008/0148220 A1* | 6/2008 | Tabaru | G06Q 10/06 | 717/103 |
| 2008/0148248 A1* | 6/2008 | Volkmer | G06F 8/65 | 717/168 |
| 2008/0189693 A1* | 8/2008 | Pathak | G06F 8/65 | 717/168 |
| 2008/0263439 A1* | 10/2008 | Oz | G06F 17/3089 | 715/235 |
| 2009/0075641 A1* | 3/2009 | Guven | G06F 8/65 | 455/419 |
| 2009/0089775 A1* | 4/2009 | Zusman | G06F 8/65 | 717/173 |
| 2009/0119657 A1* | 5/2009 | Link, II | G06F 8/64 | 717/171 |
| 2009/0150878 A1* | 6/2009 | Pathak | G06F 8/65 | 717/172 |
| 2009/0240791 A1* | 9/2009 | Sakurai | G06F 8/65 | 709/221 |
| 2009/0265699 A1* | 10/2009 | Toeroe | G06F 8/65 | 717/168 |
| 2010/0070962 A1* | 3/2010 | Sinn | G06F 8/65 | 717/171 |
| 2010/0083243 A1* | 4/2010 | Mincarelli | G06F 8/61 | 717/173 |
| 2010/0107150 A1 | 4/2010 | Kamada et al. | | |
| 2010/0175104 A1* | 7/2010 | Khalid | G06F 9/545 | 726/1 |
| 2010/0192120 A1* | 7/2010 | Raleigh | G06Q 10/06375 | 717/101 |
| 2010/0218187 A1* | 8/2010 | Pasupathilingam | G06F 9/4443 | 718/100 |
| 2010/0262960 A1* | 10/2010 | Oshiumi | G06F 8/65 | 717/171 |
| 2011/0004678 A1* | 1/2011 | Rothrock | G06F 8/65 | 709/223 |
| 2011/0145811 A1* | 6/2011 | Middendorf | F03D 7/047 | 717/178 |
| 2011/0307879 A1* | 12/2011 | Ishida | G06F 8/68 | 717/170 |
| 2011/0307882 A1* | 12/2011 | Shiba | G06F 8/65 | 717/173 |
| 2012/0099024 A1* | 4/2012 | Ryu | G06F 8/67 | 348/730 |

(56) References Cited

U.S. PATENT DOCUMENTS

| | | | |
|---|---|---|---|
| 2012/0102481 A1* | 4/2012 | Mani | G06F 11/0757 717/172 |
| 2012/0130725 A1* | 5/2012 | Cooper | G06Q 10/10 705/1.1 |
| 2012/0210310 A1* | 8/2012 | Cooley | G06F 8/65 717/168 |
| 2012/0291022 A1* | 11/2012 | Mehta | G06F 8/60 717/176 |
| 2013/0042227 A1* | 2/2013 | Little | G06F 8/65 717/168 |
| 2013/0042230 A1* | 2/2013 | Little | G06F 8/65 717/173 |
| 2013/0055271 A1 | 2/2013 | Yoo et al. | |
| 2013/0074061 A1* | 3/2013 | Averbuch | G06F 8/665 717/171 |
| 2013/0139138 A1* | 5/2013 | Kakos | G06F 8/65 717/168 |
| 2013/0205289 A1* | 8/2013 | Unno | G06F 8/65 717/171 |
| 2013/0246423 A1* | 9/2013 | Bhargava | G06F 21/56 707/737 |
| 2013/0263107 A1* | 10/2013 | Hamakawa | G06F 8/65 717/168 |
| 2013/0326493 A1* | 12/2013 | Poonamalli | G06F 8/65 717/168 |
| 2013/0332918 A1* | 12/2013 | Aoyagi | G06F 8/65 717/172 |
| 2014/0025974 A1* | 1/2014 | Suwabe | G06F 1/3234 713/323 |
| 2014/0047425 A1* | 2/2014 | Thapar | G06F 8/65 717/168 |
| 2014/0047426 A1* | 2/2014 | Raje | G06F 8/65 717/168 |
| 2014/0052702 A1* | 2/2014 | Fierro | G06F 8/65 707/695 |
| 2014/0053148 A1* | 2/2014 | Chan | G06F 8/41 717/174 |
| 2014/0059534 A1* | 2/2014 | Daum | G06F 8/65 717/172 |
| 2014/0089933 A1* | 3/2014 | Lioy | G06F 9/4893 718/104 |
| 2014/0173084 A1* | 6/2014 | Boivin | G06F 8/65 709/223 |
| 2014/0223423 A1* | 8/2014 | Alsina | G06F 8/65 717/173 |
| 2014/0359596 A1* | 12/2014 | Cohen | G06F 8/65 717/173 |

OTHER PUBLICATIONS

European Search Report dated Feb. 17, 2017 issued in counterpart application No. 14816837.0-1954, 7 pages.

* cited by examiner

METHOD AND APPARATUS FOR UPDATING APPLICATION

PRIORITY

This application claims priority under 35 U.S.C. § 119(a) to Korean Patent Application No. 10-2013-0075239, filed in the Korean Intellectual Property Office on Jun. 28, 2013, the entire content of which is incorporated herein by reference.

BACKGROUND OF THE INVENTION

1. Field of the Invention

The present invention relates generally to a method and an apparatus for updating an application, and more particularly, to a method and an apparatus for updating an application according to an update period.

2. Description of the Related Art

Electronic devices provide various and many applications. A user may download a new version of an application after identifying an online market to install latest versions of applications or configure an electronic device to be automatically updated.

When the user manually updates an application, the user may miss a latest update of the application which the user desires. Further, when the application is configured to be automatically updated, a version information notice event of the application is frequently generated in the electronic device, or application data of a new version is received or installed in the electronic device regardless of a user's intention whenever a version of the application is changed.

For example, when a particular application which is used by the user once or twice a month is automatically updated twice or more a month, an application of a version which the user has not used is installed in the electronic device and then the version may be changed into a higher version. In this event, the electronic device may consume communication data and power in order to perform an unnecessary application update. Further, a battery use time of a portable terminal such as a smart phone or a tablet Personal Computer (PC) may be reduced due to a frequent application update.

Accordingly, research on an application update considering both the convenience of the user and energy efficiency is required.

SUMMARY OF THE INVENTION

The present invention has been made to address at least the problems and disadvantages described above, and to provide at least the advantages described below. Accordingly, an aspect of present invention is to provide a method and an apparatus for updating an application according to an update period designated for the application when the application is updated.

Another aspect of the present invention is to provide a method and an apparatus for updating an application which can designate an update period of the application in consideration of a user pattern when the application is updated.

Another aspect of the present invention is to provide a method and an apparatus for updating an application which can configure and control an update period for each of groups distinguished according to the update period.

Another aspect of the present invention is to provide a method and an apparatus for updating an application which can control an automatic update based on an update period while not changing a conventional framework for updating the application or minimizing the change of the conventional framework.

In accordance with an aspect of the present invention, a method of updating an application by an electronic device is provided. The method includes activating an automatic update of an application installed in the electronic device; designating the application as one group of one or more groups distinguished according to an update period; and postponing an update of the application before a time point of an update period corresponding to the designated group and updating the application after the time point.

In accordance with another aspect of the present invention, an electronic device updating an application is provided. The electronic device includes a memory for storing an application designated as one group of one or more groups distinguished according to an update period; a communication unit for receiving new version information of the application pushed from an update server and transmitting an update request of the application to the update server; and a controller for controlling to activate an automatic update of the application, and controlling to transmit the update request after a time point of an update period corresponding to the designated group when the new version information is received.

In accordance with another aspect of the present invention, a method of updating an application by an electronic device is provided. The method includes detecting a use pattern of an application installed in the electronic device; designating an update period of the application based on the use pattern; receiving new version information of the application pushed from an update server; and transmitting an update request of the application to the update server after a time point of the designated update period in response to reception of the new version information.

In accordance with another aspect of the present invention, an electronic device updating an application is provided. The electronic device includes a memory for storing an update period of an application; a communication unit for receiving new version information of the application pushed from an update server; and a controller for designating the update period based on a use pattern of the application, and controlling to transmit an update request of the application to the update server after a time point of the update period when the new version information is received.

BRIEF DESCRIPTION OF THE DRAWINGS

The above and other aspects, features and advantages of the present invention will be more apparent from the following detailed description in conjunction with the accompanying drawings, in which.

Figure 1:
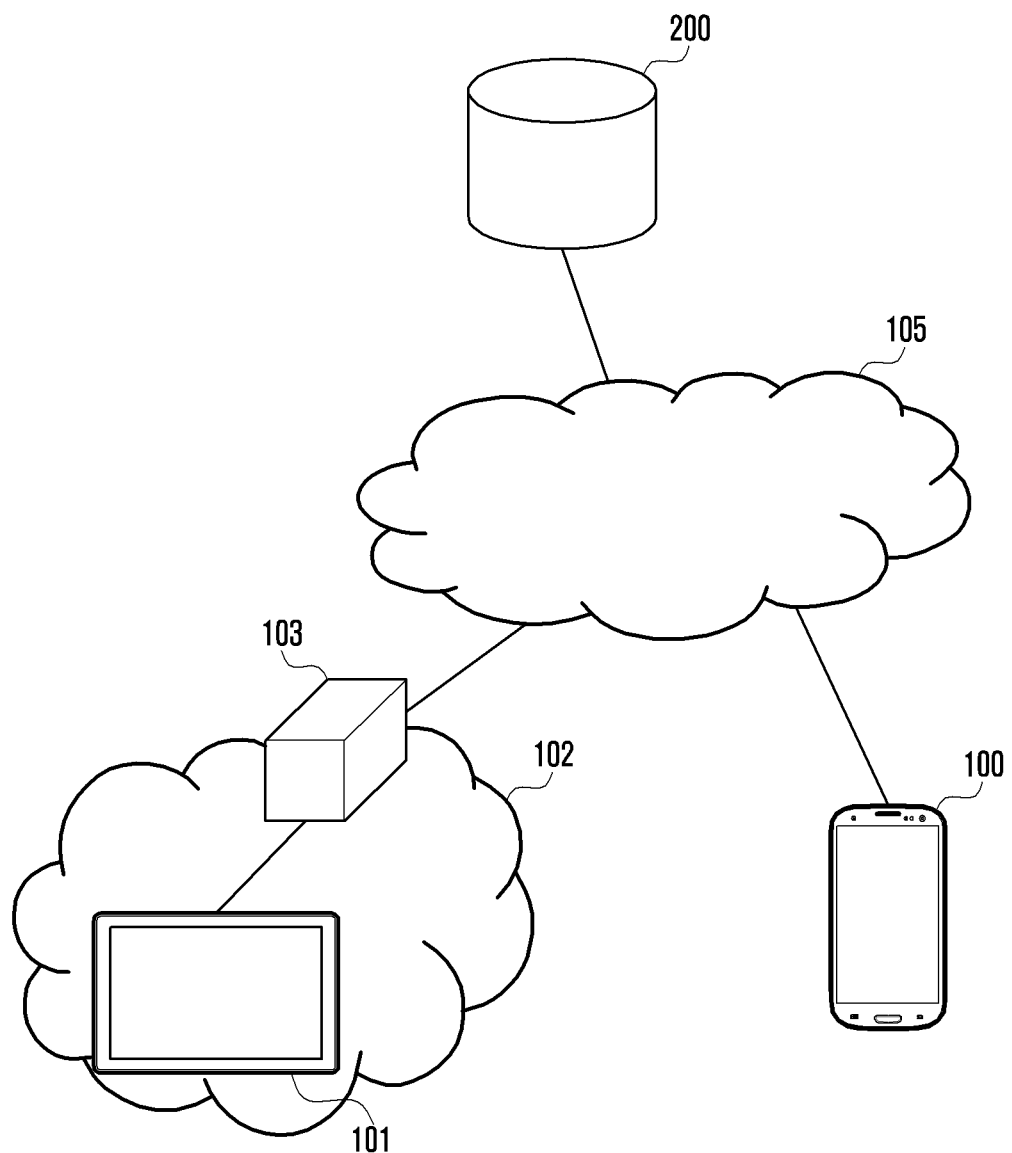
FIG. 1 illustrates an application update system according to the present invention.

DETAILED DESCRIPTION OF EMBODIMENTS
OF THE PRESENT INVENTION

Hereinafter, a method of manufacturing and using the present invention will be described in detail. The terms "unit", "module" and the like used in this specification refer to units processing at least one function or operation and may be implemented by hardware, software, or a combination thereof.

An electronic device according to an embodiment of the present invention may be implemented in various forms. For example, the electronic device described in this specification may include various devices including a portable terminal, a computer, a user interface, a controller, and the like. The portable terminal may be a mobile phone, a smart phone, a laptop computer, a tablet Personal Computer (PC), an e-book terminal, a digital broadcasting terminal, a Personal Digital Assistant (PDA), a Portable Multimedia Player (PMP), a navigation device, a wearable PC, a wrist watch phone, and the like, but is not limited thereto.

Hereinafter, an embodiment of the present invention will be described in more detail with reference to the accompanying drawings to allow those skilled in the art to easily implement the present invention. However, the present invention may be implemented in various different forms and is not limited to embodiments described herein. Further, parts irrelevant to the present invention are omitted in the drawings to make the present invention clear and the same reference numerals are designated to the same or similar components throughout this specification.

Hereinafter, it will be described as an example that an electronic device updating an application according to an embodiment of the present invention is a portable terminal, but the present invention is not limited thereto.

FIG. 1 illustrates an application update system according to an embodiment of the present invention. A system for updating an application may include electronic devices 100 and 101 and an update server 200.

The electronic devices 100 and 101 may communicate with the update server 200 through a communication network 105 such as the Internet. A communication line in various mobile communication types may be formed between the communication network 105 and the electronic device 100. Further, the electronic device 101 may be connected to a network 102 managed by an office, home, or public facility through a short-range wireless communication scheme. A gateway 103 may operate to form a communication link between the electronic device 101 included in the network 102 and the communication network 105. For example, the gateway 103 may be an access point which can form a home network.

For example, the electronic devices 100 and 101 may be a smart phone or a tablet Personal Computer (PC). The electronic devices 100 and 101 receive version information from the update server 200 and transmit an update request of an application to the update server 200. The electronic devices 100 and 101 may receive application data corresponding to a new version. Further, the electronic devices 100 and 101 may receive version information of an application from the update server 200 through an application managing application or download an application designated by a user input.

The update server 200 may provide application data (or an application file) and information on the application to the electronic devices 100 and 101. The update server 200 may access an application installed in the electronic devices 100 and 101 or a user account of the electronic devices 100 and 101 to manage information on installed applications. The application server 200 may transmit version information of applications installed in the electronic devices 100 and 101 and receives an update request from the electronic devices 100 and 101. Further, the update server 200 may receive updated (or new) application data from an application provider and store the application data in an application database, so as to manage the application data. The update server 200 may transmit the application data to the electronic devices 100 and 101 according to requests of the electronic devices 100 and 101.

For example, the system for updating the application according to the embodiment of the present invention may include electronic devices based on various platforms, such as an Android platform of Google, an iOS platform of Apple, a Bada platform or a TIZEN platform of Samsung, and a Windows platform of Microsoft. Further, the system may include an update server which can be operated in various types by a service provider, an application provider, or a device manufacturer such as Google, Apple, and Samsung like an application market.

The system according to the embodiment of the present invention is not limited to the above described electronic device or update server and may include an electronic device based on various platforms or an update server operating in various types. Further, even when a platform provider of the electronic device and an operator of the update server are different, the system for updating the application according to the embodiment of the present invention can still operate.

Figure 2:
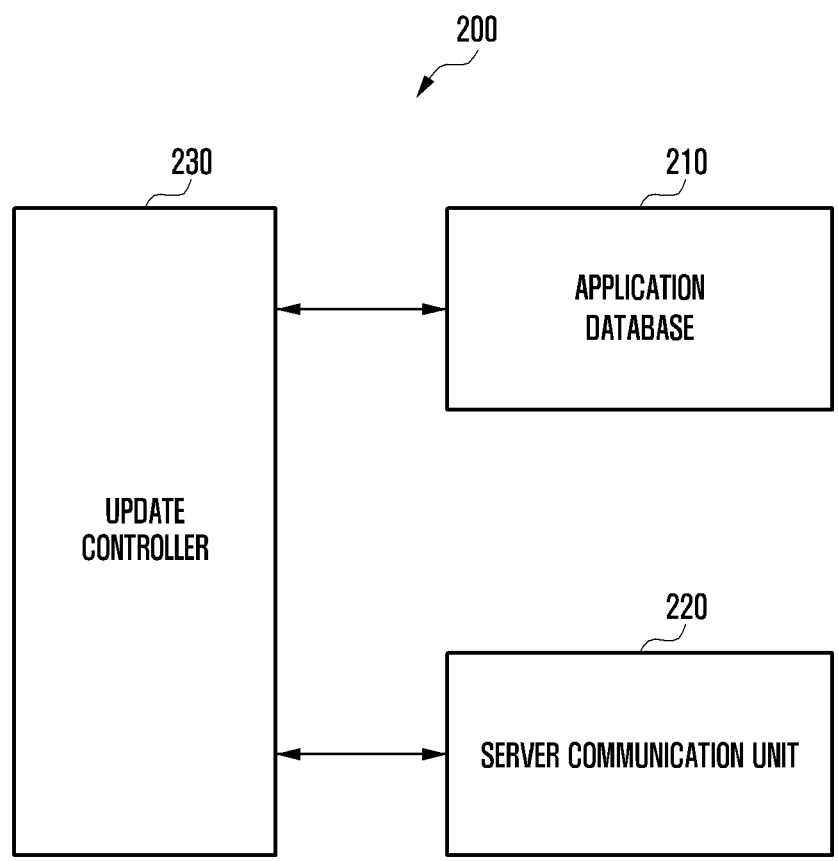
FIG. 2 illustrates an update server according to an embodiment of the present invention.

FIG. 2 illustrates an update server according to an embodiment of the present invention.

The update server 200 may include an application database 210, a server communication unit 220, and an update controller 230.

The application database 210 may store information on applications installed in each of electronic devices including the electronic device 100. Further, the application database 210 may store information on applications corresponding to user accounts including a user account of the electronic device 100. The user account may be an ID, a password, a phone number, an address, or an e-mail address of the user for an access to the update server 200. Information on applications corresponding to electronic devices or user accounts may include identification information, version information and the like for distinguishing the applications.

Version information of the application corresponding to the electronic device or the user account managed by the server may include a connection state by the corresponding user account, a version of application data most recently transmitted to the corresponding electronic device, or a past history of transmission (or download) of the application data.

Further, version information of the application corresponding to the electronic device or the user account managed by the server may be received from at least one electronic device registered by the corresponding electronic device or the corresponding user account. For example, the version information may be version information of an installed application reported by the electronic device.

The application database 210 may store application data (or a file) of a new version received from an application producer, a service provider, or a database manager, identification information or version information of the corresponding application, and the like.

When the update controller 230 receives data of an application of a new version, identification information, or version information from the server communication unit 220, the update controller 230 may control to store the received data or information in the application database 210.

A method in which the update server 200 transmits version information of the corresponding application to the electronic device 100 to update the application according to an embodiment of the present invention may include a push mode, a pull mode, or a hybrid mode of selectively using the push mode and the pull mode, but the present invention is not limited thereto, and it is noted that various transmission methods can be used. For convenience of the description, the push mode and the pull mode will be described.

In the push mode, the update server 200 may unsolicitedly transmit new version information of the application installed in the electronic device 100 to the electronic device 100 without any request from the electronic device 100. In the pull mode, the electronic device 100 may make a request for the latest version information of a particular application managed by the update server 200 to the update server 200 and the update server 200 may transmit the latest version information to the electronic device 100 in response to the request.

For example, in the push mode, the update controller 230 may generate new version information of an application of a new version and control the new version information to be pushed to the electronic device corresponding to the corresponding application or at least one electronic device corresponding to a user account. A time point when the update server 200 pushes the new version information to the electronic device 100 after receiving application data of the new version may be determined by a design of a manager of the update server 200, a manufacturer or a service provider regardless of a configuration or a condition of the electronic device 100. For example, the update controller 230 may transmit the new version information to the electronic device immediately whenever the update controller 230 receives application data of a new version.

The server communication unit 220 may transmit new version information (or latest version information) of the application to the electronic device 100 having the corresponding application installed therein. The server communication unit 220 receives an update request of the application from the electronic device 100. The server communication unit 220 may transmit application data of the new version to the electronic device 100 in response to the update request. Further, before transmitting the latest version information in the pull mode, the server communication unit 220 may receive a version information request of at least one application.

Further, the application database 210 of the update server 200 may record the version of the application data recently transmitted to the electronic device 100 as information on the application installed in the electronic device 100. The server communication unit 220 may receive information on a group designated for the application from the electronic device 100. The update controller 230 may determine that the application installed in the electronic device 100 is designated as a particular group among one or more groups based on the information on the designated group. The one or more groups refer to one or more application groups distinguished according to an update period. Each of the groups has an update period. When the update controller 230 may receive a new version of the application from an application producer or a service provider, the update controller 230 may generate new version information of the application. The update controller 230 may control the new version information to be transmitted to the electronic device 100 after a time point of the update period corresponding to the designated group. The server communication unit 220 may receive an update request of the application from the electronic device 100 after the new version information is transmitted. The server communication unit 220 may transmit application data corresponding to the new version information to the electronic device 100. The update controller 230 may update a version of the application data corresponding to the new version information as information on the application installed in the electronic device 100.

Figure 3:
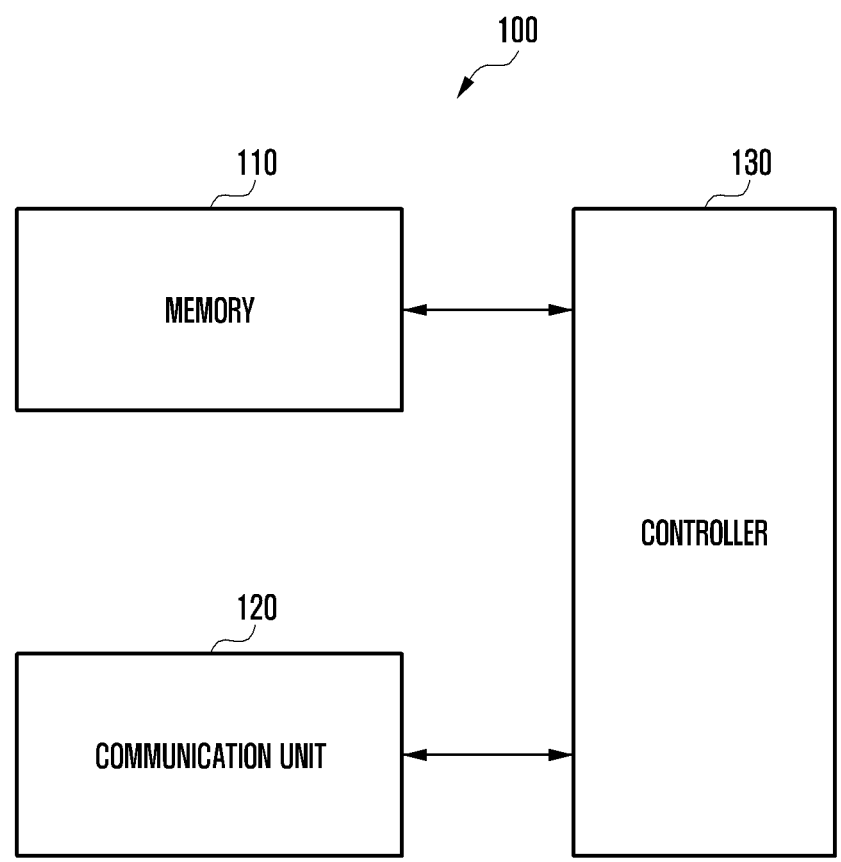
FIG. 3 illustrates an electronic device according to an embodiment of the present invention.

FIG. 3 illustrates the electronic device according to an embodiment of the present invention. The electronic device 100 may include a memory 110, a communication unit 120, and a controller 130.

The memory 110 may store an application designated as one group among one or more groups distinguished according to an update period. For example, the one or more groups may have different update periods. Further, the update periods corresponding to the one or more groups may be changed through a user interface.

The communication unit 120 may receive new version information of the pushed application from the update server 200 and transmits an update request of the application to the update server 200.

The controller 130 may control an activation of an automatic update of the application. When new version information is received, the controller 130 may control to transmit an update request after a time point of an update period corresponding to the designated group. Further, the controller 130 may postpone an update of the application before the time point of the update period corresponding to the designated group. In addition, the controller 130 may detect a use pattern of the application and designate the application as one group of the one or more groups based on the use pattern. The use pattern may refer to at least one of a use frequency and a use time of the application. Further, instead of an operation of the controller 130 designating the application as a particular group based on the use pattern, the group of the application may be designated according to a user's selection input through a user interface unit.

Figure 4:
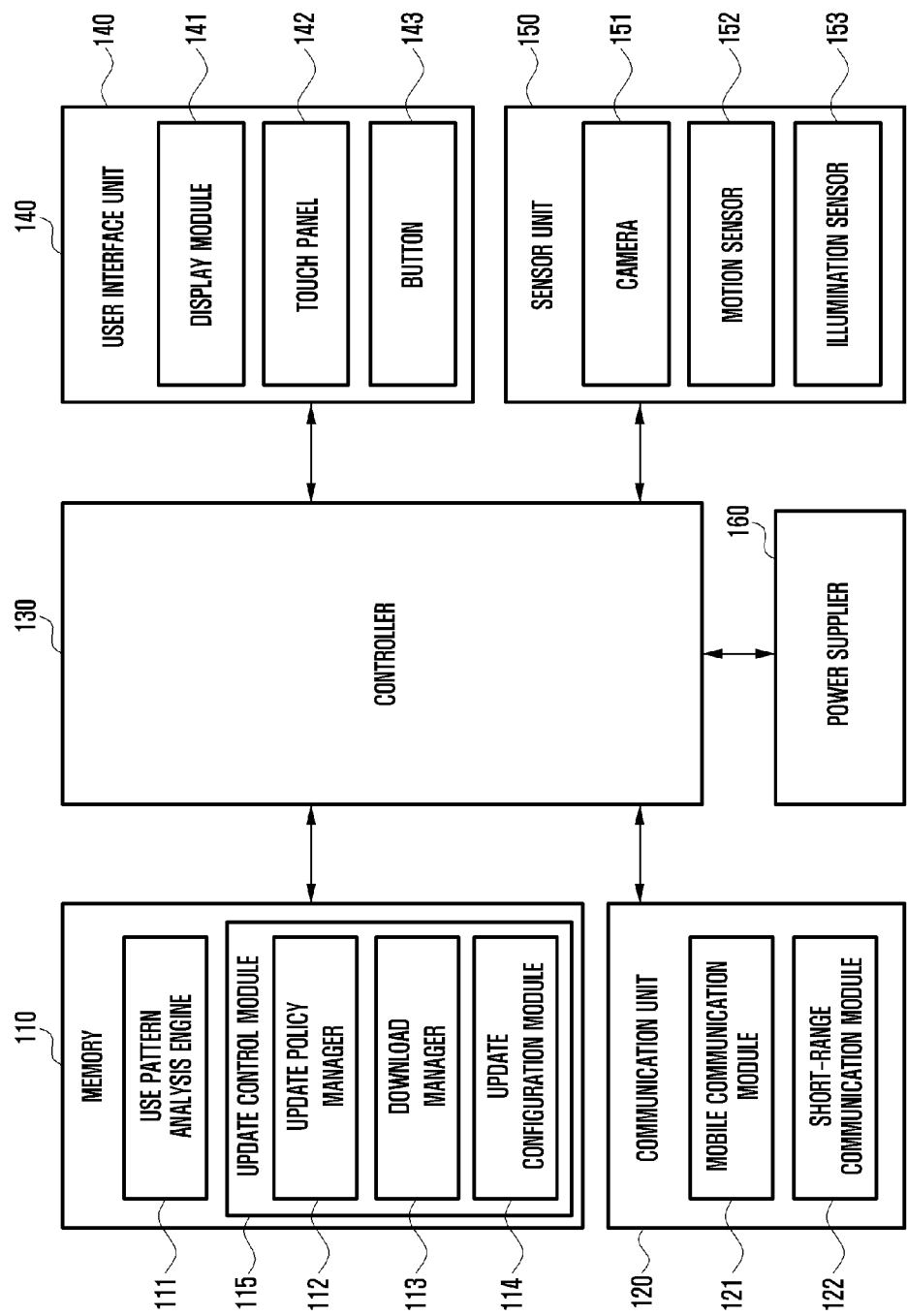
FIG. 4 illustrates electronic device in more detail according to an embodiment of the present invention.

FIG. 4 illustrates another example of the electronic device according to an embodiment of the present invention in more detail. The electronic device 100 may include the memory 110, the communication unit 120, and the controller 130. The electronic device 100 may further include a user interface unit 140, a sensor unit 150, and a power supplier 160.

The memory 110 may store an application designated as one group among one or more groups distinguished according to an update period. Further, the memory 110 may store installed applications distinguished as at least one group. At least one group may correspond to an update period of at least one application included in the corresponding group. At least one application included in a particular group may have a particular update period.

Further, the memory 110 may include a use pattern analysis engine 111 and an update control module 115. The update control module 115 may include an update policy manager 112, a download manager 113, and an update configuration module 114.

The controller 130 may access the use pattern analysis engine 111 and the update control module 115 from the memory 110 and load an execution task of the controller 130 to perform a calculation and control. The use pattern analysis engine 111 and the update control module 115 operating under a control of the controller 130 will be described in more detail with reference to FIG. 5.

Further, the memory 110 may store a signal or data input/output in accordance with and operation of the communication unit 120, the user interface unit 140, or the sensor unit 150 according to a control of the controller 130. The memory 110 may store a control program and an application for controlling the overall operation of the electronic device 100 or for controlling the controller 130.

The memory 110 may include a Read Only Memory (ROM), Random Access Memory (RAM), or a memory card (for example, an SD card, a memory stick, or the like) installed in the electronic device 100. The memory 110 may include a non-volatile memory, a volatile memory, or a Hard Disk Drive (HDD) or a Solid State Drive (SSD).

Further, the memory 110 may store an application configuring an update, applications having various functions such as a navigation function and a game function, images for providing a Graphical User Interface (GUI) related to the applications, databases or data related to a method of processing user information, a document, and a touch input, background images (a menu screen, an idle screen, or the like) or operating programs required for driving the electronic device 100, and data acquired by the sensor unit 150.

The memory 110 may include a machine (for example, a computer)-readable medium. The memory 110 may access information from the machine-readable medium and stores the accessed information according to a control of the controller 130. The machine-readable medium may be a medium providing data to a machine to allow the machine to perform a particular function. For example, the machine-readable medium may be a storage medium. The machine-readable medium includes at least one of a floppy disk, a flexible disk, a hard disk, a magnetic tape, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a flash-EPROM, but is not limited thereto.

The communication unit 120 may receive new version information on the application pushed from the update server 200. Also, the communication unit 120 may transmit an update request of the application to the update server 200, whereby the communication unit 120 may receive application data corresponding to the new version information from the update server 200 in response to the update request.

The communication unit 120 may include a mobile communication module 121 and a short-range communication module 122 for forming a communication link with the update server 200 through the communication network 105.

The mobile communication module 121 may include a communication module based on a standard such as GSM, WCDMA, HSDPA, LTE, WiMAX, and the like, using a technique such as TDM, TDMA, FDM, FDMA, CDM, COMA, OFDM, OFDMA, MIMO, a smart antenna, and the like.

The short-range communication module 122 may include a communication module of a short-range communication scheme such as WiFi, Bluetooth, Zigbee, Infrared Data Association (IrDA), RFID, or Near Field Communication (NFC). The communication module of the Bluetooth scheme may operate based on a Bluetooth Low Energy (BLE) communication scheme or a Bluetooth Classic communication scheme. The communication module of the WiFi scheme may operate as an access point based on the IEEE 802.11 communication standard or provide access to the access point to form a short-range wireless LAN.

Further, the communication unit 120 may include various communication modules such as a sound wave communication module (not shown) and a visible ray communication module, but is not limited thereto.

The controller 130 may control an activation of an automatic update of the application. The controller 130 may postpone an update of the application before the time point of the update period corresponding to the designated group. The controller 130 may control to transmit an update request after the time point of the update period corresponding to the designated group when receiving new version information.

When receiving application data corresponding to the new version information from the update server 200 in response to the update request, the controller 130 controls to install the received application data.

The controller 130 compares the received new version information with an installed version of the application installed in the electronic device 100. When the new version information is a higher level version than the installed version, the controller 130 may control to transmit the update request of the application to the update server 200 after the time point of the update period corresponding to the designated group.

In addition, when the application is designated as one group of the one or more groups, the controller 130 may drive a timer for identifying an update time point of the application. The timer may expire when it has the same value as that of the update period corresponding to the designated group. The time point of the update period corresponding to the designated group may be a time point when the timer expires.

Before the time point of the update period corresponding to the designated group, the controller 130 may filter an update request event generated in response to reception of the new version information and controls an update schedule to update the application after the time point of the update period corresponding to the designated group. This will be described in more detail with reference to FIG. 5.

Further, when an update condition is satisfied after the time point of the update period corresponding to the designated group, the controller 130 may control to transmit the update request. For example, the update condition may be at least one of a state where the electronic device 100 is in a WiFi connection, a state where the electronic device 100 is being charged, a state where the electronic device 100 is connected to a designated access point, a state where the electronic device 100 enters a designated time zone, and a state where the electronic device enters a time zone in which the electronic device 100 is not being used for a long time (for example, at bedtime). Further, the controller 130 may receive sensed data from the sensor unit 150 to determine whether the state of the electronic device 100 satisfies the update condition.

For example, the controller 130 may identify the WiFi connection state according to an operation state of the short-range communication module 122 of the communication unit 120 or receive information on whether the electronic device 100 is being charged from the power supplier 160. In order to determine whether the electronic device 100 is a sleeping state, the controller 130 may record the existence or nonexistence of a user interaction in each time zone to statistically determine whether the electronic device 100 is in the sleeping state or to detect a state of the electronic device 100 or a surrounding environment by using the sensor unit 150 to predict the sleeping state. The controller 130 may determine an intensity of light received by the electronic device 100 by using a camera 151 or an illumination sensor 153 of the sensor unit 150, or measure a change in light or an image received for a predetermined time to determine whether the electronic device 100 is in the sleeping state or a control intention of the user with respect to a terminal. Further, the controller 130 may detect whether the electronic device 100 has not been used for a long time by using motion data of the electronic device 100 received from a motion sensor 152 of the sensor unit 150 or control intention of the user with respect to the terminal.

In addition, the controller 130 may detect a use pattern of the application. The controller 130 may designate the application as one of the one or more groups based on the use pattern. The use pattern may refer to at least one of a use frequency and a use time of the application.

For example, the use frequency may be a number of user inputs or controls of the application for a predetermined time or a number of executions of the application according to a user input. The use time may be an execution time from an execution of the application to a termination of the application for a predetermined time, or an estimated time during which there is an actual user input or an interaction providing an output. During execution, there are various applications, such as an application requiring a user's control, an application being executed in a background, and an application of which a result is not displayed, so that the use frequency and the user time may be considered together in detecting the user pattern. In a case of an application requiring a user interaction, the controller 130 may estimate a use time based on a use state (for example, whether the user looks at the screen of the electronic device 100 and whether the user grasps the electronic device 100) of the electronic device 100 of the user based on data measured by the sensor unit 150.

Further, the controller 130 may include a Central Processing Unit (CPU), a Read Only Memory (ROM) storing a control program for controlling the electronic device 100, and a Random Access Memory (RAM) used as a storage area for storing a signal or data input from the outside of the electronic device 100 or for work performed in the electronic device 100. The CPU may include a multi core such as a dual core, a quadruple core, or an octa core. The CPU, the ROM, and the RAM may be connected to each other through internal buses or implemented in a module form.

The user interface unit 140 may receive a user input for executing and terminating the application. Further, the user interface unit 140 may provide a user interface for changing an update period or configuring an update condition through an update configuration application (or widget).

In addition, the user interface unit 140 may provide a user interface for designating the application Installed in the electronic device 100 as a particular group. A group corresponding to the application may be designated according to a user's selection input through the user interface. For example, a function for selecting the update period corresponding to the application may be provided by the user interface. In this case, the controller 130 may generate a group corresponding to the selected update period, update information on the group such that the corresponding application is included in the group corresponding to the selected update period, and control the updated information to be stored in the memory 110.

The user interface unit 140 may include a display module 141, a touch panel 142, and a button 143.

The display unit 141 may be at least one of a Liquid Crystal Display (LCD), a Thin Film Transistor-Liquid Crystal Display (TFT-LCD), an Organic Light-Emitting Diode (OLED), a flexible display, a 3D display, and an Electro-Phoretic Display (EPD).

The touch panel 142 may be implemented in a resistive type, a capacitive type, an Electro-Magnetic Resonance (EMR) type, an infrared type, or an acoustic wave type.

The display module 141 and the touch panel 142 may be combined to operate as a touch screen. At this time, the user interface unit 140 may further include a touch screen controller. The touch screen may receive at least one touch through a user's body (for example, fingers) or a touchable input unit. Further, the touch screen may include a pen recognition panel which can recognize an input through a pen such as a stylus pen or an electronic pen. In addition, the touch screen may be formed in a structure where a panel detecting an input through a finger or an input unit by a change in induced electromotive force, a display panel, and a panel detecting a contact between the touch screen and a finger or an input unit by a change in resistance or capacitance adhere to each other or are sequentially deposited while some of the panels are spaced apart from each other. The touch screen controller may convert an analog signal received from the touch screen to a digital signal (for example, X and Y coordinates) and transmit the converted digital signal to the controller 130. The controller 130 may control the touch screen by using the digital signal received from the touch screen controller. Further, the touch screen controller may be included in the controller 130.

The button 143 may receive a button (key) input from the user for the control of the electronic device 100. The button 143 may include a physical button (or key) formed on the electronic device 100, or a virtual button or virtual keypad displayed on the touch screen. The physical keypad formed in the electronic device 100 may be excluded according to a structure of the electronic device 100.

The sensor unit 150 may include the camera 151, the motion sensor 152, and the illumination sensor 153.

The camera 151 may photograph surroundings of the electronic device 100 or the user. The camera 151 may include a lens system and an image sensor photographing a still image or a video according to a control of the controller 130. Further, a plurality of cameras 151 may be disposed on a front surface and a rear surface of the electronic device 100. The camera 151 may convert an optical signal input through the lens system to an electrical image signal and transmit the electrical image signal to the controller 130 or the display module 141.

The motion sensor 152 may detect a motion of the electronic device 100 (for example, a rotation of the electronic device 100 or an acceleration or vibration applied to the electronic device 100). The motion sensor 152 may include a gyro sensor and an acceleration sensor.

The illumination sensor 153 may detect an amount of ambient light of the electronic device 100.

The sensor unit 150 may further include various sensors such as a proximity sensor detecting whether the user approaches the electronic device 100, a geo-magnetic sensor detecting a point of the compass by using the Earth's magnetic field, and a Global Positioning System (GPS) module. The GPS module may receive radio waves from a plurality of GPS satellites in the Earth's orbit and calculates a position of the electronic device 100 by using Time of Arrival from the GPS satellites to the electronic device 100.

The power supplier 160 may include at least one battery, a power supply circuit, or a battery charging circuit arranged at the housing of the electronic device 100 according to a control of the controller 130. The power supplier 160 may supply power to the electronic device 100. Further, the power supplier 160 may supply power input from an external power source through a wired cable connected to a connector to component modules of the electronic device 100 or a battery. In addition, the power supplier 160 may supply power wirelessly input from an external power source through a wireless charging technology to component modules of the electronic device 100 or control a battery to be charged.

In the electronic device 100 according to another embodiment of the present invention, the controller 130 may detect a use pattern of the installed application. The controller 130 may designate the application as one of the one or more groups based on the use pattern. The communication unit 120 may transmit information on the group designated for the application to the update server 200. For example, the information on the designated group may be a value or an index indicating a group identifier or an update period. Further, the communication unit 120 may receive new version information of the application from the update server 200. The controller 130 may determine whether the new version information is a higher level version than an installed version. When the new version information is a higher level version than the installed version, the communication unit 120 may transmit an update request of the application to the update server 200. The communication unit 120 may receive application data corresponding to the new version information from the update server 200 in response to the update request. The controller 130 may control to install the received application data.

Figure 5:
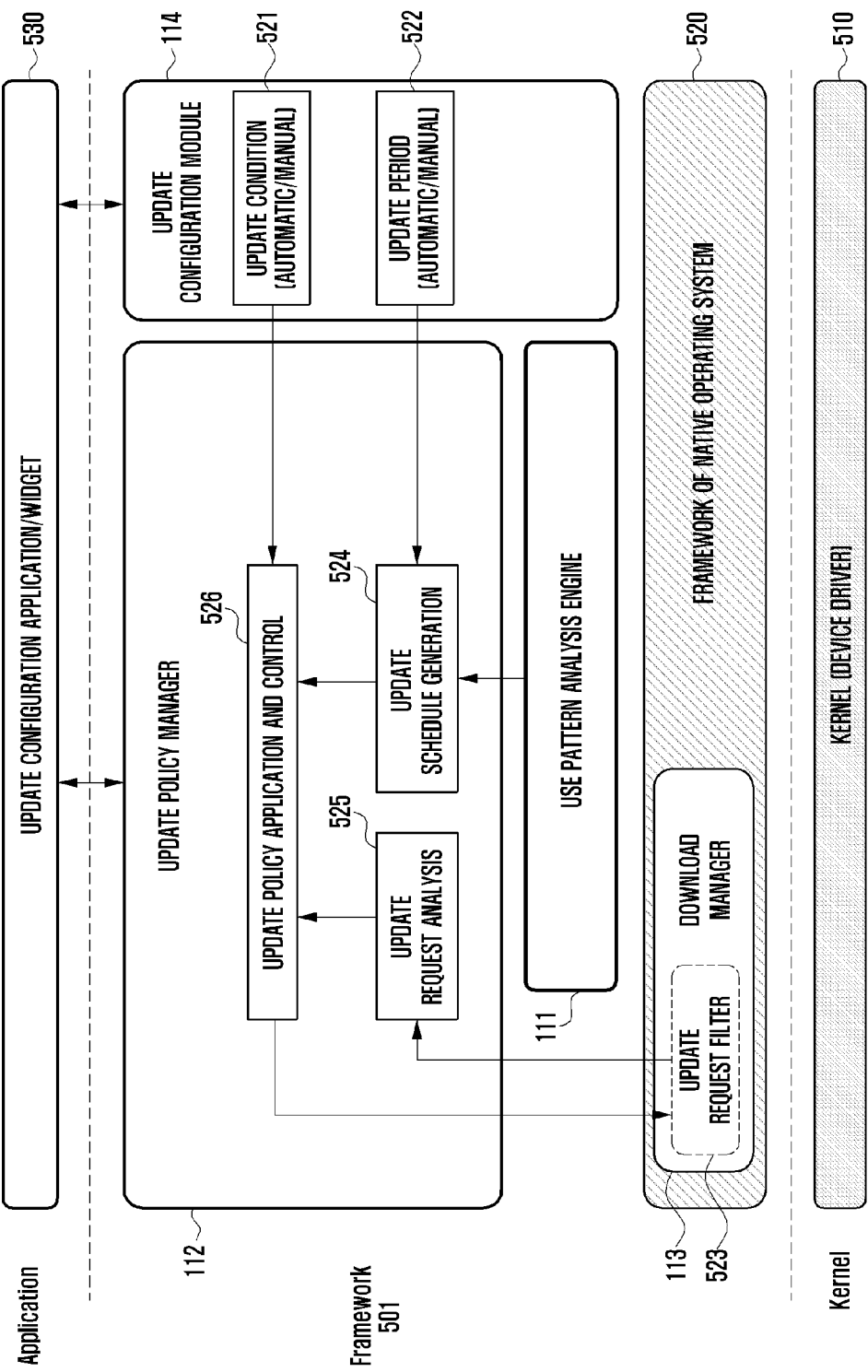
FIG. 5 illustrates a software module for updating an application in the electronic device according to an embodiment of the present invention.

FIG. 5 illustrates a software module for updating the application in the electronic device according to an embodiment of the present invention. The software module illustrated in FIG. 5 may be included in the memory 100 of the electronic device 100 and loaded to the controller 130 of the electronic device 100 to perform a processing operation for updating the application. It can be understood by those skilled in the art that the software module is implemented by a function module of the controller 130.

The controller 130 of the electronic device 100 may access the use pattern analysis engine 111 and the update control module 115 from the memory 110 and load an execution task of the controller 130 to perform a calculation and control for updating the application. The update control module 115 may include the update policy manager 112, the download manager 113, and the update configuration module 114.

The software module may include a kernel 510, a framework 501, and an application 530. The software module may further include a library (not shown) located between the kernel 510 and the framework 501 a runtime module (or a virtual machine) (not shown) for driving an operating system.

The kernel 510 may include device drivers. For example, the device driver of the kernel 510 may include a display driver, a camera driver, a memory driver, and a power management driver. The kernel 510 manages and secures a background thread and a memory and manages the hardware of various devices. For example, the kernel 510 may be a LINUX kernel.

The framework 501 may include the use pattern analysis engine 111, the update policy manager 112, the update configuration module 114, and a framework 520 of a native operating system.

The framework 520 of the native operating system may include an Application Programming Interface (API). For example, the native operating system may be an Android operating system of Google.

Further, the use pattern analysis engine 111, the update policy manager 112, and the update configuration module 114 included in the framework 501 may be the API or include at least one API. For example, the application 530 including the update configuration application (or update configuration widget) may call a kernel or a library through the API of the framework.

The framework 520 of the native operating system includes the download manager 113 generating an update request event in response to new version information received from the update server 200. The framework 501 can access the download manager 113 or includes an update request filter 523 which can transmit/receive an update request event or a control signal generated in the download manager 113. Further, the download manager 113 may include the update request filter 523.

Before the time point of the update period corresponding to the designated group, the update request filter 523 filters the update request event generated in the download manager 113 in response to reception of the new version information, so as to postpone transmission of the update request to the update server 200.

The update policy manager 112 may receive an update request from the update request filter 523 and perform an update request analysis 525. The update policy manager 112 may identify a group including the application corresponding to the update request event through the update request analysis 525. Further, the update policy manager 112 may perform an update policy application and control 526 by controlling the update request filter 523 to update the corresponding application after the time point of the update period corresponding to the group.

The use pattern analysis engine 111 may detect a use pattern of the application installed in the electronic device 100. The use pattern analysis engine 111 may determine that an application is included in a particular application group corresponding to a particular update period by analyzing the detected use pattern. That is, the use pattern analysis engine 111 may classify the application as one of the one or more groups. For example, the one or more groups may include an always update group (hereinafter referred to as an "always group"), a sometimes update group (hereinafter referred to as a "sometimes group"), and a rarely update group (hereinafter referred to as a "rarely group"). For example, an application included in the always group may be updated all the time whenever new version information is received, an application included in the sometimes group may have an update period of three days, and an application included in the rarely group may have an update period of seven days.

The update policy manager 112 may perform an update schedule generation 524 according to an update period corresponding to information on the group designated for the application received from the use pattern analysis engine 111. Further, the update policy manager 112 may perform the update policy application and control 526 to update the application according to the generated update schedule.

An update configuration application (or widget) included in the application 530 may operate while being connected to the update policy manager 112 or the update configuration module 114. The electronic device 100 may be configured to determine whether to activate an automatic update, whether to activate a smart update considering an update period, an update period, or an update condition through the update configuration application.

Figure 7:
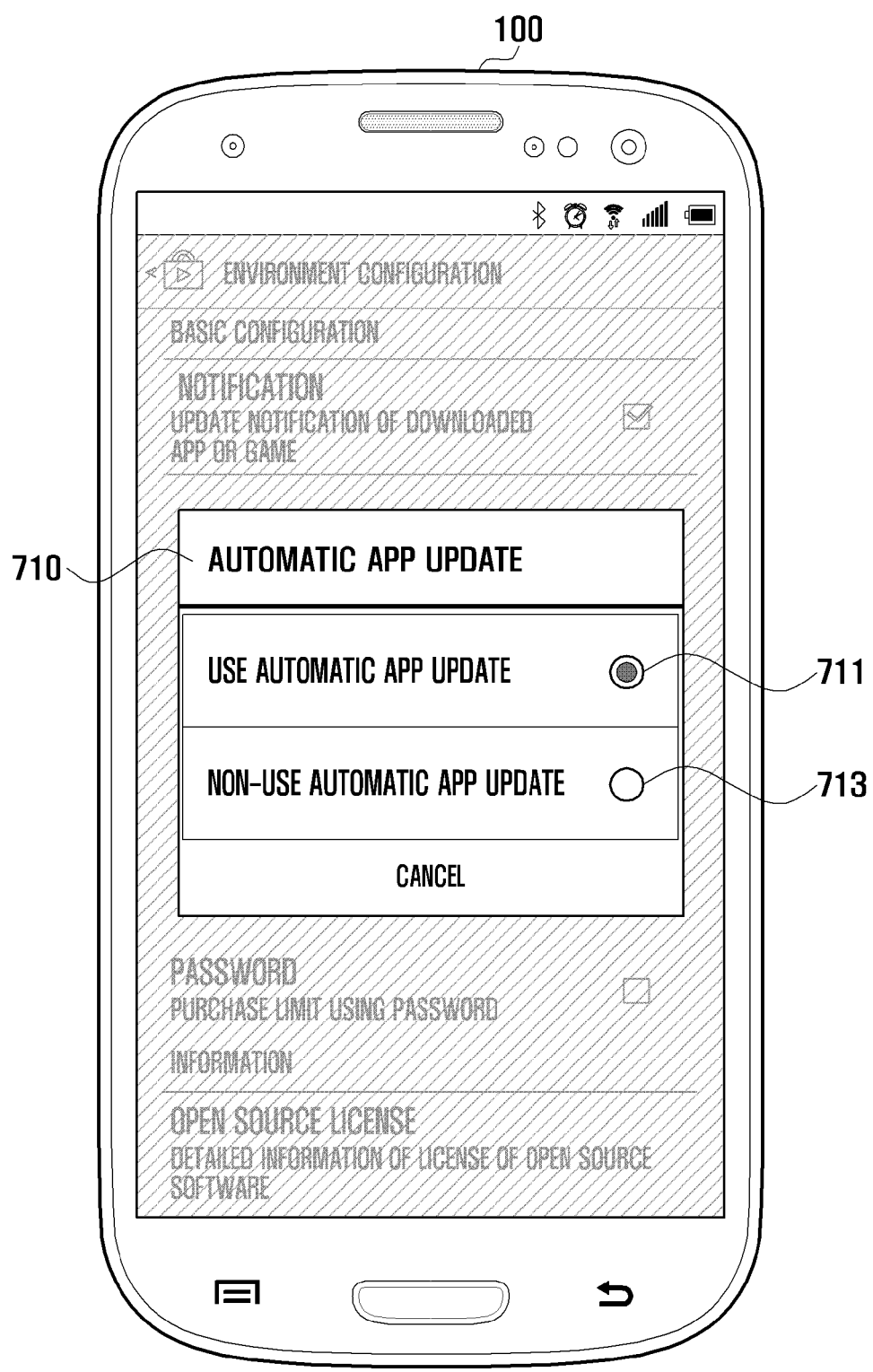
FIG. 7 illustrates a user interface configuring an automatic update of an application according to an embodiment of the present invention.

For example, referring to FIG. 7, the update configuration application may provide a user interface 710 for determining whether to activate the automatic update of the application on the screen of the electronic device 100. The user interface 710 may include interaction objects such as radio buttons 711 and 713, a check box, and the like for receiving a user input. The user interface 710 may provide a function of activating the automatic update of all installed applications. Further, a user interface for selecting whether to activate the automatic update of each of the installed applications may be provided. In addition, an application to be updated in consideration of the update period may be an application of which the automatic update is activated.

Figure 8:
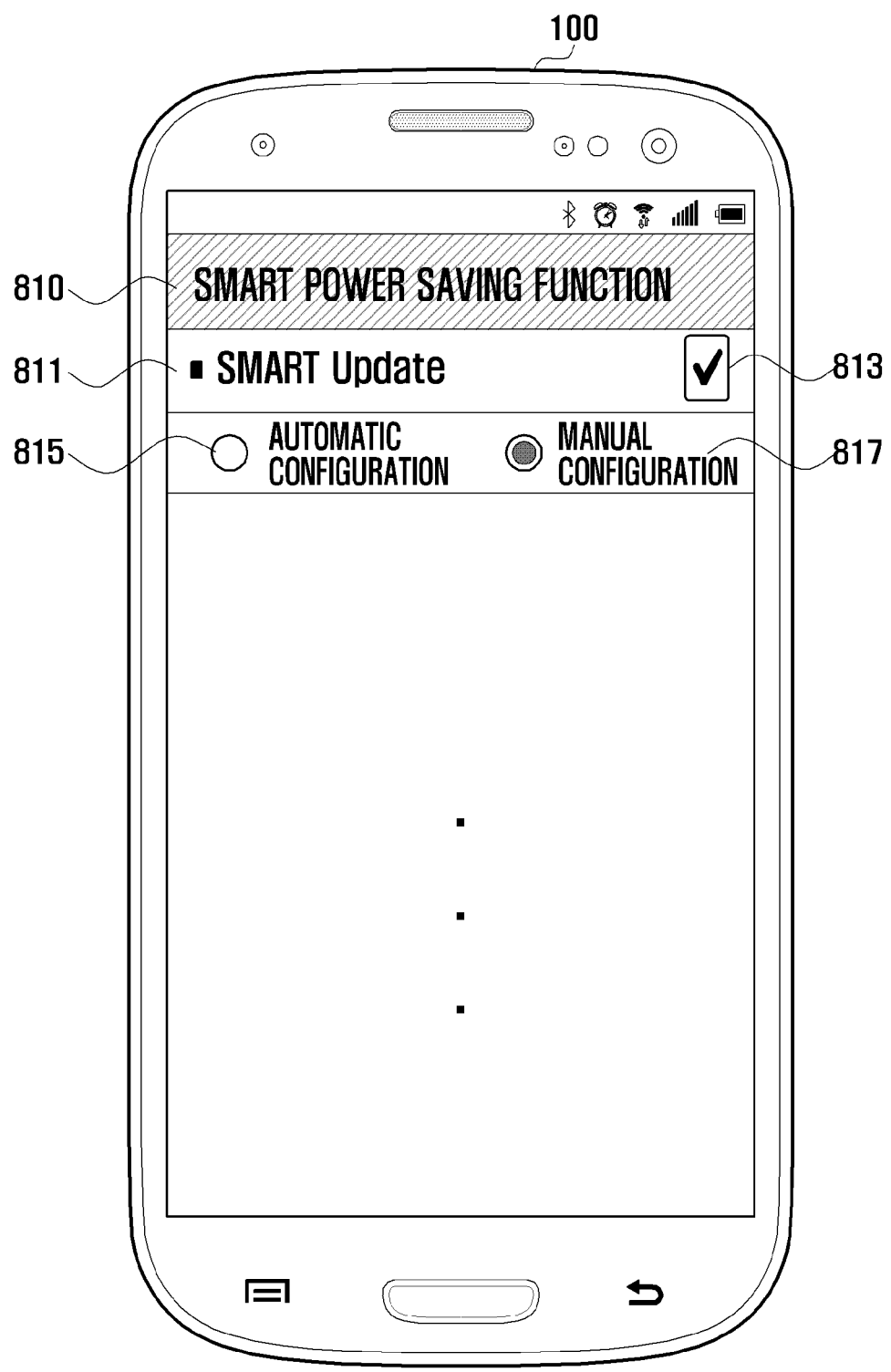
FIG. 8 illustrates a user interface configuring an application update function based on an update period according to an embodiment of the present invention.

Referring to FIG. 8, the electronic device 100 may provide a user interface 810 for configuring whether to automatically or manually configure the update period of the application by using the update configuration application. A smart update 811 refers to an update considering the update period in the automatic update, and information on whether to consider the update period may be expressed by an interaction object such as a check box 813 or a radio button, and a designated matter may be displayed according to an input of the user. Further, the user interface 810 may include an object for selecting an automatic configuration 815 of the update period or a manual configuration 817 by the user.

Figure 9:
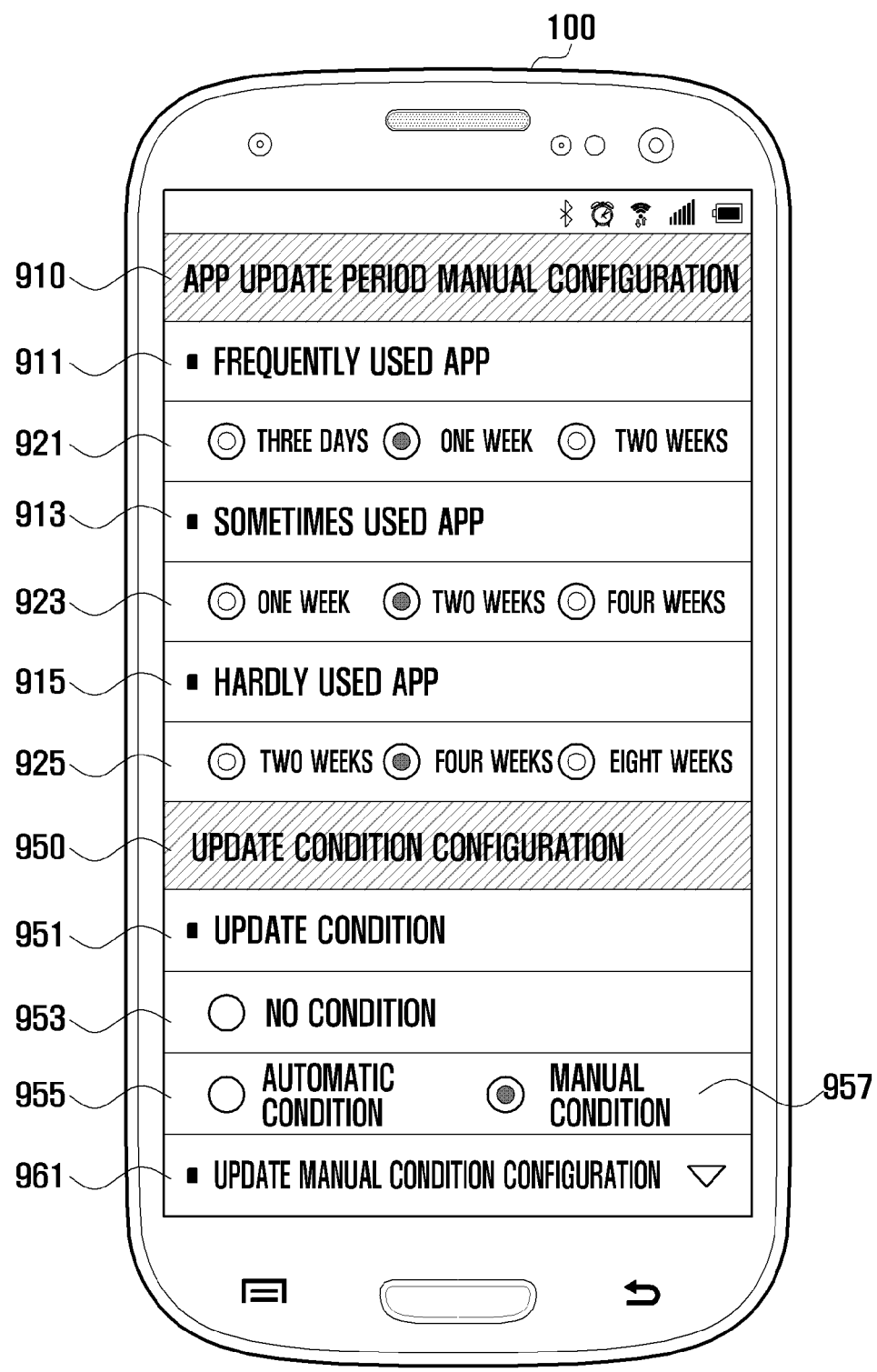
FIG. 9 illustrates a user interface configuring an update period according to an embodiment of the present invention.

Referring to FIG. 9, when the manual configuration 817 of FIG. 8 is selected, the electronic device 100 may provide a user interface 910 for the manual configuration of the update period of the application by using the update configuration application. For example, the one or more groups distinguished according to the update period may include a frequently used application group ("always group") 911, a sometimes used application group ("sometimes group") 913, and a hardly used application group ("rarely group") 915. The user interface 910 may include interaction objects such as radio buttons 921, 923, and 925 receiving an update period corresponding to each group from the user or displaying the configured update period.

Further, the electronic device 100 may provide a user interface 950 for configuring an update condition by using the update configuration application. For example, items of an update condition 951 may include a no condition 953 indicating that there is no restrictive condition to perform an update except for the update period, an automatic condition 955 configured by default or having an automatically configured condition as a restrictive condition, and a manual condition 957 having a manually configured restrictive condition according to a user's selection. Further, when the manual condition 957 is selected, an item of an update manual condition configuration 961 may be displayed.

Figure 10:
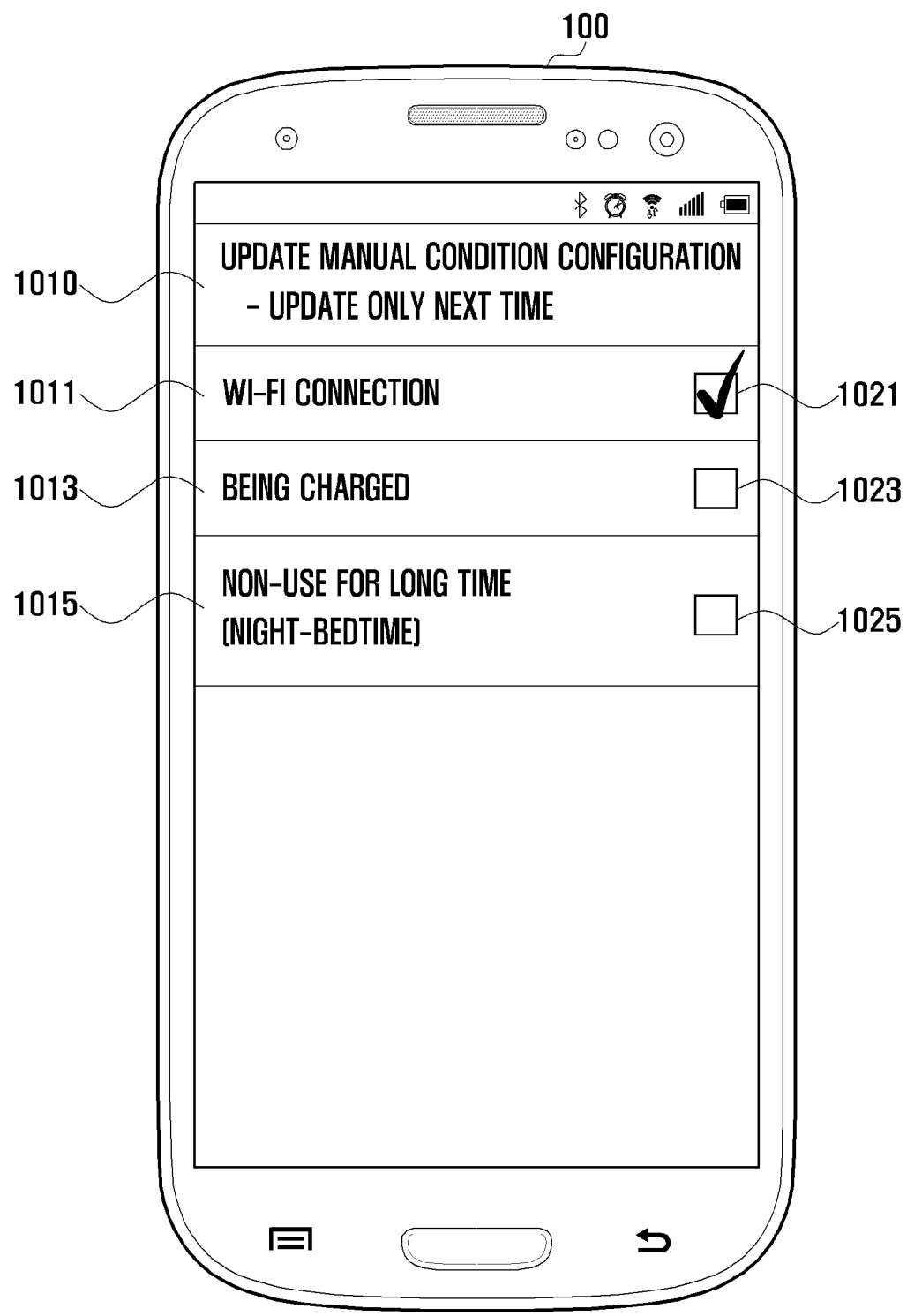
FIG. 10 illustrates a user interface configuring an update condition according to an embodiment of the present invention.

For example, referring to FIG. 10, when the update manual condition configuration 961 is selected, the electronic device 100 may provide a user interface 1010 for the update manual condition configuration by using the update configuration application. The update condition may include items corresponding to a case 1011 where the electronic device 100 is connected through WiFi, a case 1013 where the electronic device 100 is being charged, a case 1015 wherein the electronic device 100 has not been used for a long time (for example, at bedtime), a case (not shown) where the electronic device 100 is connected to a designated access point, and a case (not shown) where the electronic device 100 enters a designated time zone. Only when a state of the electronic device 100 satisfies an item selected through interaction objects such as check boxes 1021, 1023, and 1025, the application can be updated.

Referring back to FIG. 5, the update configuration module 114 may transmit an automatically or manually configured update period 522 or an update automatic condition configured or update manual condition configured update condition 521 to the update policy manager 112 through the update configuration application (or widget). Further, the update configuration module 114 may control the configured update period 522 to be reflected in the update schedule generation 524 or the configured update condition 521 to be reflected in the update policy application and control 526.

Based on the update period according to the embodiment of the present invention, the software module for performing the update of the application may be configured in various forms as well as the above described structure. For example, it can be understood by those skilled in the art that at least some of the components included in the software module may be changed or omitted, at least two of the components may be combined, or a new component module may be added or combined to make a reconfiguration.

Figure 6A:
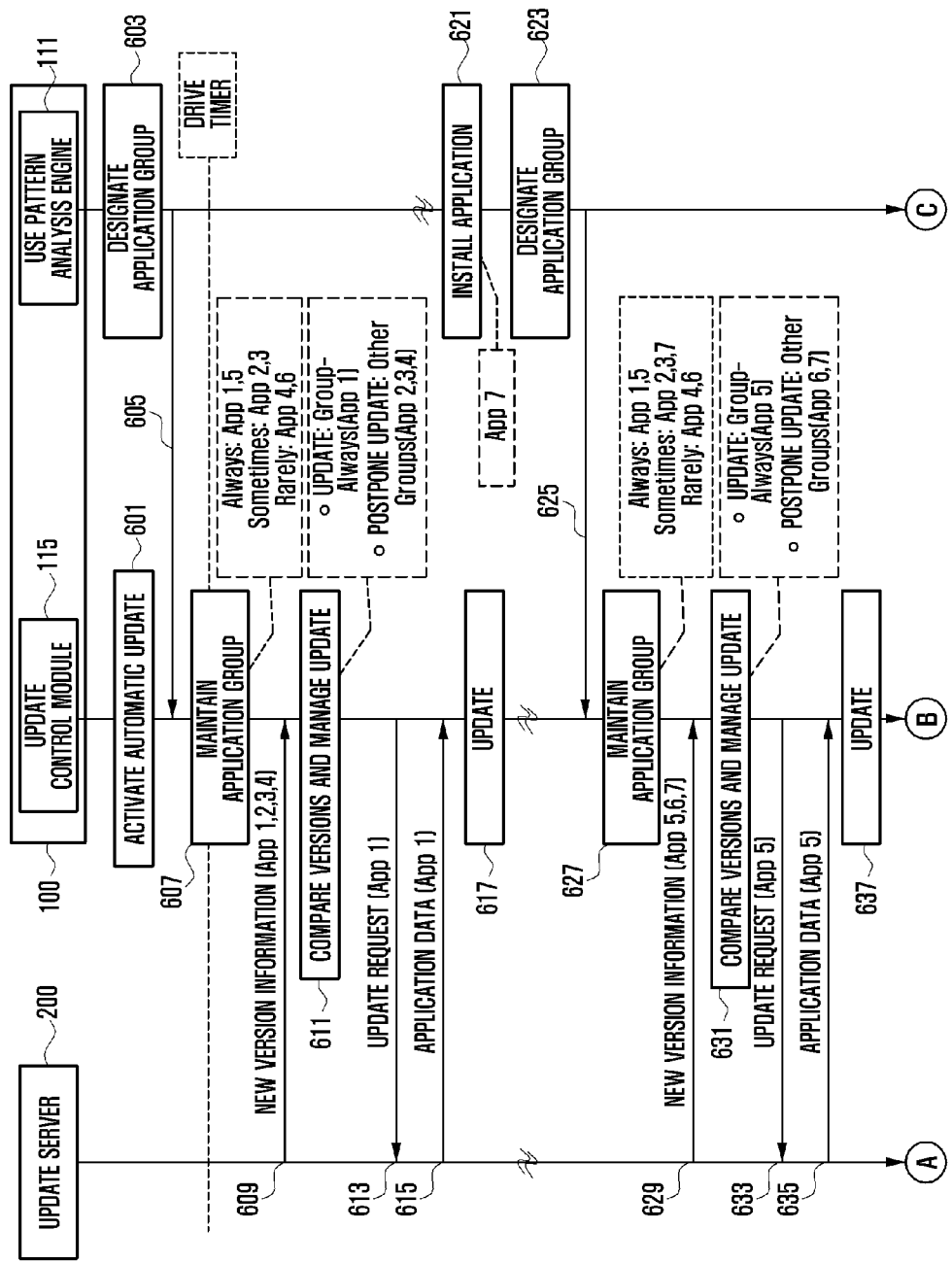
FIGS. 6A and 6B illustrate an application update process according to an embodiment of the present invention.
Figure 6B:
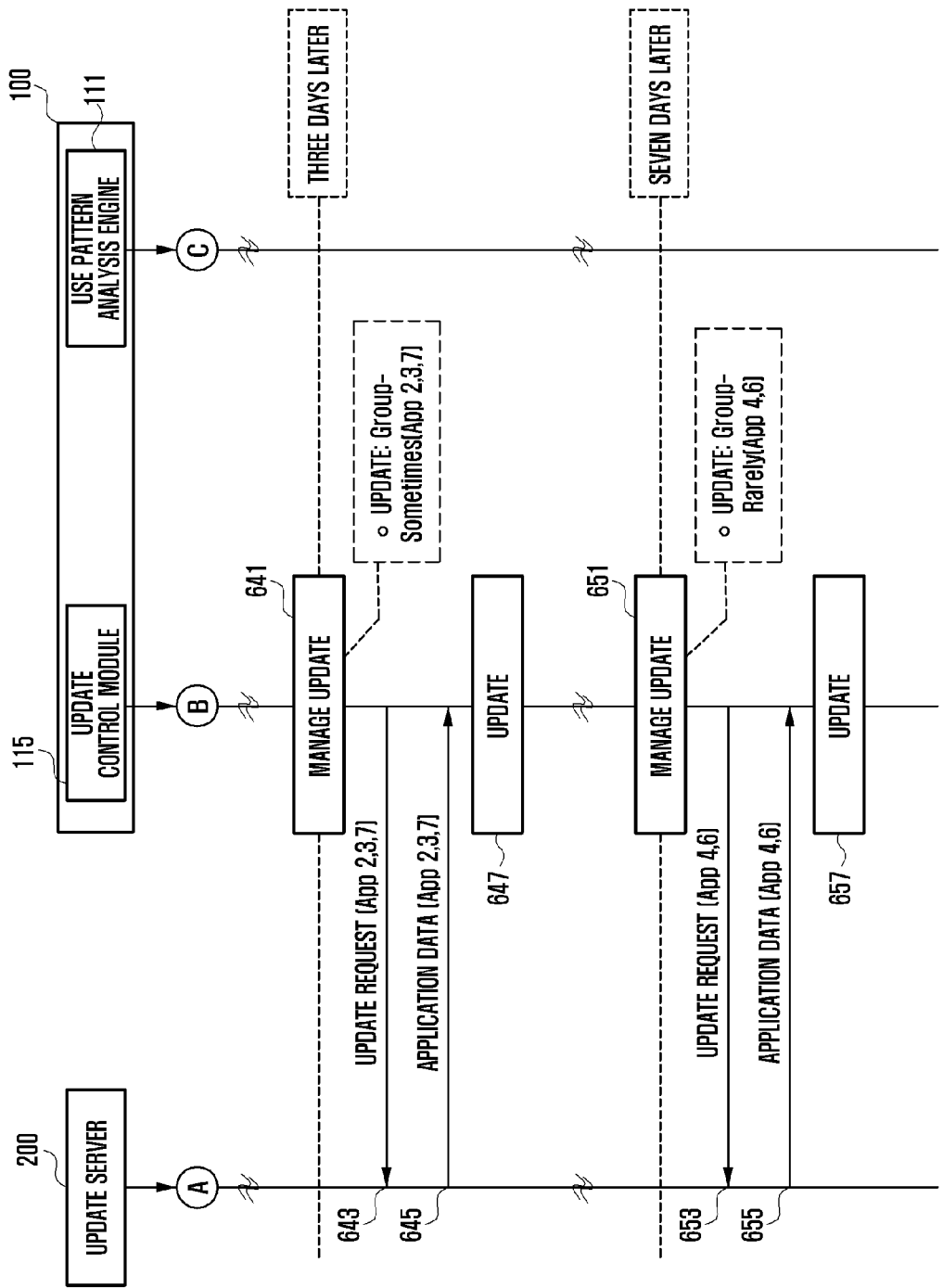

FIGS. 6A and 6B illustrate an application update process according to an embodiment of the present invention.

The electronic device 100 may include the update control module 115 and the use pattern analysis engine 111 operating according to a control of the controller 130.

In step 601, the update control module 115 of the electronic device 100 may control to activate the automatic update.

In step 603, the use pattern analysis engine 111 of the electronic device 100 may designate the installed application as one of the one or more groups.

In step 605, the use pattern analysis engine 111 may transmit information on the group designated for the application to the update control module 115.

In step 607, the update control module 115 may maintain at least one application group. For example, the "always group" may include application 1 (hereinafter referred to as "App 1"), the "sometimes group" may include App 2 and App 3, and the "rarely group" may include App 4 and App 6. The application included in the "always group" may be configured to be always updated, an update period of the "sometimes group" may be three days, and an update period of the "rarely group" may be seven days. Further, the update control module 115 may drive a timer for identifying an update period.

In step 609, the update server 200 may transmit new version information to the electronic device 100. For example, the new version information may be version information of App 1, App 2, App 3, and App 4.

In step 611, the update control module 115 may compare the received new version information with installed versions of the applications installed in the electronic device 100. Further, when the new version information is a higher level version than the installed version, the update control module 115 may manage the update such that an update request of the application is transmitted to the update server 200 after the time point of the update period corresponding to the designated group. For example, the update control module 115 may control the update schedule such that the "always group" is updated and updates of other groups are postponed to be updated after the time point of the corresponding update periods. The updates of App 2, App 3, App 4 and App 6 which are not included in the "always group" may be postponed even though new version information is received.

In step 613, the electronic device 100 may transmit an update request to the update server 200. For example, the update request may include information on App 1 which is an application included in an intersection of the new version information and the "always group".

In step 615, the update server 200 may transmit application data in response to the update request. For example, the application data may be data (or file) of a new version for App 1.

In step 617, the update control module 115 may update the application by controlling the received application data to be installed. For example, App 1 data of the new version may be installed.

Further, in step 621, an application may be additionally installed in the electronic device 100. For example, the added application may be App 7. The use pattern analysis engine 111 may detect a use pattern of the added application.

In step 623, the use pattern analysis engine 111 may designate a group corresponding to the added application based on the detected use pattern. For example, the use pattern analysis engine 111 may designate App 7 as being in the "sometimes group".

In step 625, the use pattern analysis engine 111 may transmit information on the group designated for the added application to the update control module 115.

In step 627, the update control module 115 may maintain at least one application group. For example, the update control module 115 may add App 7 to the "sometimes group" and manage the "sometimes group".

In step 629, the update server 200 may transmit new version information to the electronic device 100. For example, the new version information may be version information of App 5, App 6, and App 7.

In step 631, the update control module 115 may compare the received new version information with installed versions of the applications installed in the electronic device 100. Further, when the new version information is a higher level version than the installed version, the update control module 115 may manage the update such that an update request of the application is transmitted to the update server 200 after the time point of the update period corresponding to the designated group. For example, the update control module 115 may control the update schedule such that the "always group" is updated and updates of other groups are postponed to be updated after the time point of the corresponding update periods.

In step 633, the electronic device 100 may transmit an update request to the update server 200. For example, the update request may include information on App 5 which is an application included in an intersection of the new version information and the "always group".

In step 635, the update server 200 may transmit application data in response to the update request. For example, the application data may be data (or a file) of a new version for App 5.

In step 637, the update control module 115 may update the application by controlling the received application data to be installed. For example, App 5 data of the new version may be installed.

Further, in step 641, after the time point of the update period corresponding to a particular group, the update control module 115 may manage the update such that an update of the particular group is performed. For example, after three days corresponding to the update period of the "sometimes group", the update control module 115 may control to update App 2, App 3, and App 7 which are applications included in the new version information received in steps 609 and 629 and the sometimes group.

In step 643, the electronic device 100 may transmit an update request to the update server 200. For example, the update request may include information on App 2, App 3, and App 7.

In step 645, the update server 200 may transmit application data in response to the update request. For example, the application data may be data (or file) of new versions for App 2, App 3, and App 7.

In step 647, the update control module 115 may update the application by controlling the received application data to be installed. For example, App 2 data, App 3 data, and App 7 data of the new versions may be installed.

Further, in step 651, after the time point of the update period corresponding to another particular group, the update control module 115 may manage the update such that an update of another particular group is performed. For example, after seven days corresponding to the update period of the "rarely group", the update control module 115 may control to update App 4 and App 6 which are applications included in the new version information received in steps 609 and 629 and the "sometimes group".

In step 653, the electronic device 100 may transmit an update request to the update server 200. For example, the update request may include information on App 4 and App 6.

In step 655, the update server 200 may transmit application data in response to the update request. For example, the application data may be data (or file) of new versions for App 4 and App 6.

In step 657, the update control module 115 may update the application by controlling the received application data to be installed. For example, App 4 data and App 6 data of the new versions may be installed.

Figure 11:
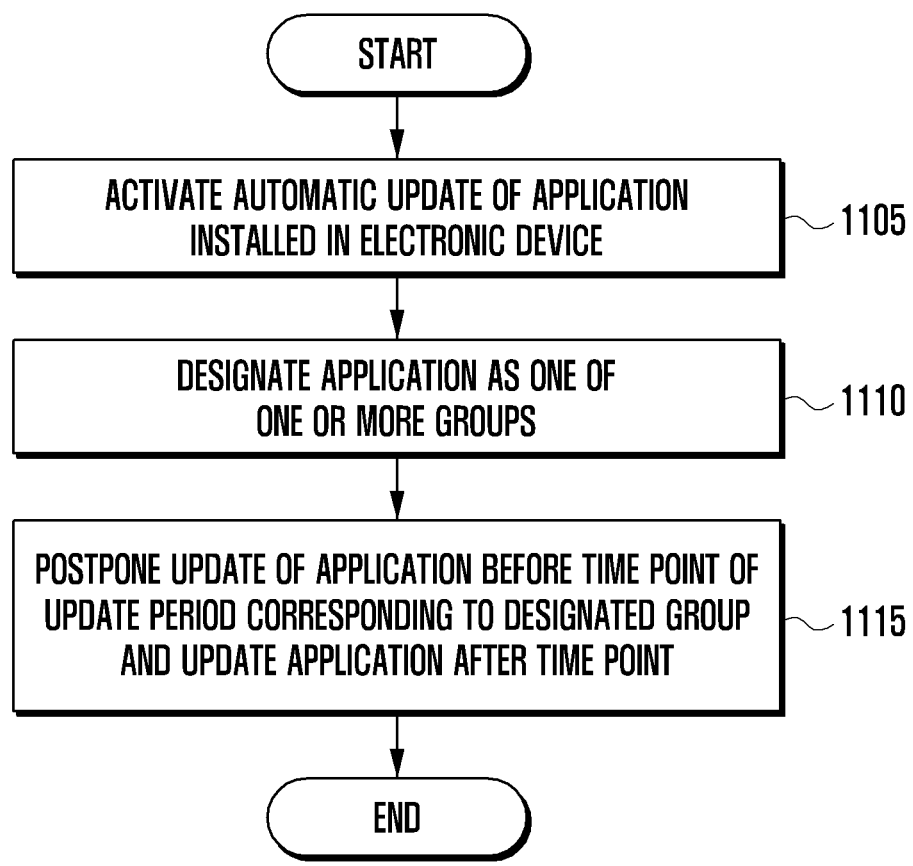
FIG. 11 is a flowchart illustrating a method of updating an application in the electronic device according to an embodiment of the present invention.

FIG. 11 is a flowchart illustrating a method of updating the application in the electronic device according to an embodiment of the present invention.

In step 1105, the electronic device 100 may activate an automatic update of the application installed in the electronic device 100.

In step 1110, the electronic device 100 may designate the application as one of the one or more groups distinguished according to the update period. For example, the designation of the application as a particular group may be automatically made by the electronic device 100 based on the use pattern of the application or a group corresponding to the application may be designated according to a user's selection input through the user interface.

In step 1115, the electronic device 100 may postpone the update of the application until the time point of the update period corresponding to the designated group and updates the application after the time point of the update period corresponding to the designated group.

Figure 12:
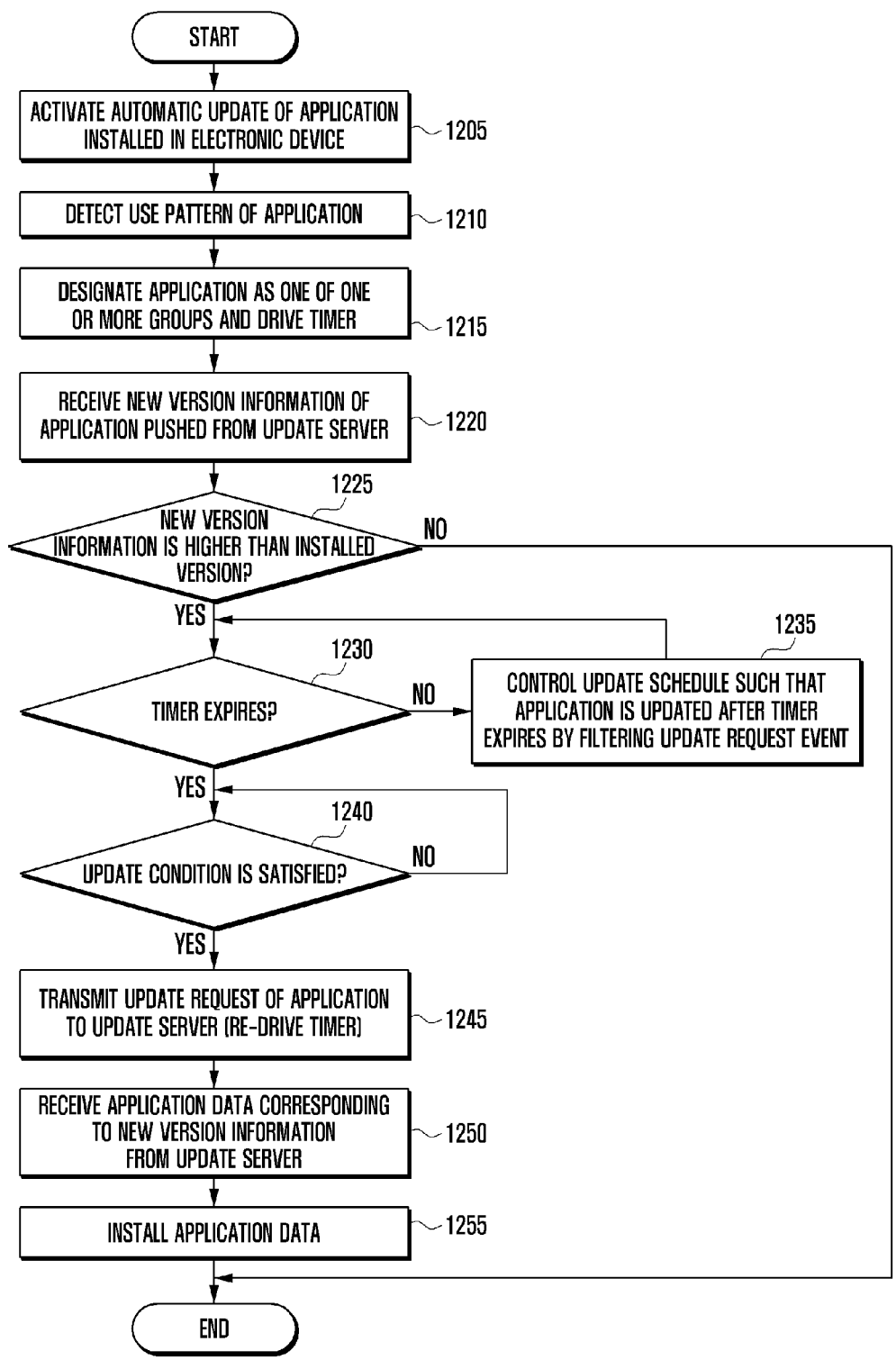
FIG. 12 is a flowchart illustrating in more detail the method of updating the application in the electronic device according to an embodiment of the present invention.

FIG. 12 is a flowchart illustrating in more detail the method of updating the application in the electronic device according to an embodiment of the present invention.

In step 1205, the electronic device 100 may activate an automatic update of the application installed in the electronic device 100.

In step 1210, the electronic device 100 may detect a use pattern of the application. The use pattern may refer to at least one of a use frequency and a use time of the application.

In step 1215, the electronic device 100 may designate the application as one of the one or more groups distinguished according to the update period based on the use pattern. For example, the one or more groups may have different update periods and the update periods corresponding to the one or more groups may be changed through the user interface. Further, the electronic device 100 may drive a timer for identifying the update period.

In step 1220, the electronic device 100 may receive new version information of the application pushed from the update server 200.

In step 1225, the electronic device 100 may determine whether the new version information is a higher level version than an installed version. When the level of the new version information is lower than or equal to the level of the installed version, the update of the application is terminated.

When the level of the new version information is higher than the level of the installed version, the electronic device 100 may determine whether a timer corresponding to a designated group has expired to determine whether the time point of the update period corresponding to the designated group has arrived in step 1230.

When the timer has not expired, the electronic device 100 controls the update schedule such that the application is updated after the timer expires by filtering an update request event generated in response to reception of the new version information in step 1235.

When the timer has expired, the electronic device 100 determines whether an update condition is satisfied if the update condition is configured other than for a condition that the update period corresponding to the designated group has passed in step 1240. The update condition may be a state where the electronic device 100 is connected through WiFi, a state where the electronic device 100 is being charged, a state where the electronic device 100 is connected to a designated access point, and a state where the electronic device 100 enters a designated time zone or a state where the electronic device 100 enters a time zone where the electronic device 100 is not used for a long time. Further, when the update condition is not configured, step 1240 may be omitted.

When the update condition is not satisfied, the update may be postponed until the update condition is satisfied in step 1240. Further, when other new version information is received from the update server 200 before the update condition is satisfied, the electronic device 100 may control the schedule such that the update into other new version information is made when the update condition is satisfied.

When the update condition is satisfied, the electronic device 100 may transmit an update request of the application to the update server 200 in step 1245. Further, the electronic device 100 may re-drive a timer corresponding to the update period corresponding to the designated group. The time point when the timer is re-driven may be a time point equal to a time point when the update period ends, a time point when application data of a new version is received, or a time point when application data is installed in the electronic device 100 according to a selection by a service provider, a producer, or a user. In addition to a method of managing the update period in the unit of groups, a method of managing the update period according to the timer corresponding to each of the applications may be applied.

In step 1250, the electronic device 100 may receive application data corresponding to the new version information from the update server 200.

In step 1255, the electronic device 100 may install the received application data.

In FIG. 12, the method of updating the application may correspond to the push mode of the method in which the update server 200 transmits version information of the corresponding application to the electronic device 100.

Hereinafter, a case where the electronic device 100 operates in accordance with the pull mode will be briefly described.

After performing steps 1205 to 1215, the electronic device 100 may determine whether the update period corresponding to the designated group has passed by determining whether the timer has expired in step 1230. When the timer has expired, the electronic device 100 may transmit a version information request of the application to the update server 200 after the time point when the timer expires.

The electronic device 100 may receive version information of the application from the update server 200 in response to the version information request. In step 1225, the electronic device 100 may determine whether the level of the new version information is a higher level version than a level of an installed version. When the level of the new version information is higher than the installed version, the electronic device 100 transmits an update request of the application to the update server in step 1245. Thereafter, the electronic device 100 may perform steps 1250 to 1255.

Figure 13:
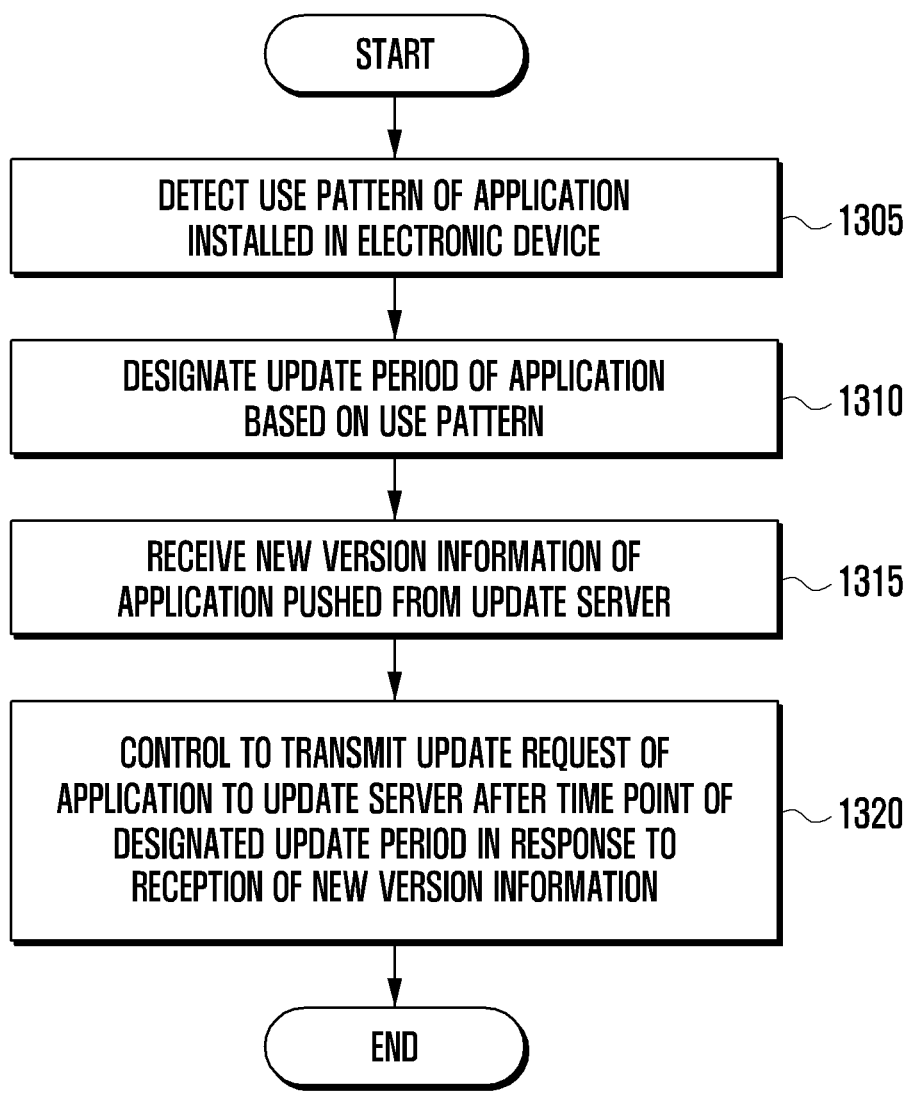
FIG. 13 is a flowchart illustrating the method of updating the application in the electronic device according to another embodiment of the present invention.

FIG. 13 is a flowchart illustrating the method of updating the application in the electronic device according to another embodiment of the present invention.

In step 1305, the electronic device 100 may detect a use pattern of the application installed in the electronic device 100. The use pattern may refer to at least one of a use frequency and a use time of the application.

In step 1310, the electronic device 100 may designate an update period of the application based on the use pattern. For example, each application may have an update period independently managed regardless of another application, and the update period of the application may be managed by using a timer corresponding to the update period.

In step 1315, the electronic device 100 may receive new version information of the application pushed from the update server 200.

In step 1320, the electronic device may control the update request of the application to be transmitted to the update server 200 after the time point of the designated update period in response to reception of the new version information. Before the time point of the designated update period, the electronic device 100 may postpone transmission of the update request of the application.

Figure 14:
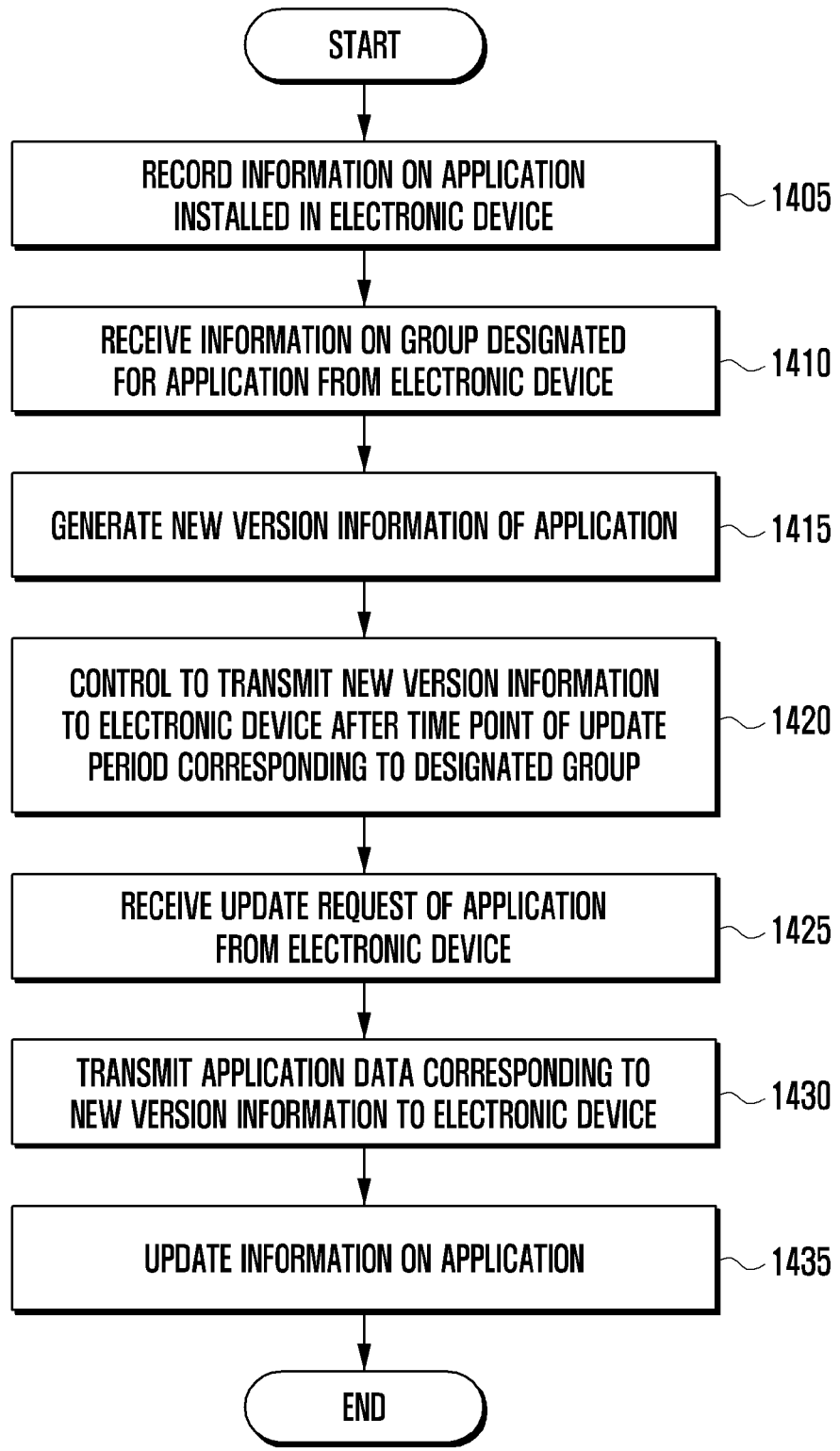
FIG. 14 is a flowchart illustrating the method of updating the application by an update server according to another embodiment of the present invention.

FIG. 14 is a flowchart illustrating the method of updating the application by the update server according to another embodiment of the present invention.

In step 1405, the update server 200 may record version information of the application data recently transmitted to the electronic device 100 as information on the application installed in the electronic device 100.

In step 1410, the update server 200 may receive information on a group designated for the application from the electronic device 100. The update server 200 may manage one or more groups and stores information on applications included in each of the groups. Each of the groups corresponds to an update period. The information on the designated group may include Identification information of the application, information on a group, or update period information.

When a new version of the application is received from an application producer or a service provider, the update server 200 may generate new version information of the application in step 1415.

In step 1420, the update server 200 may control the new version information to be transmitted to the electronic device 100 after the time point of the update period corresponding to the designated group. Even though the new version is received in step 1415, the update server 200 may postpone transmission of the new version information.

After the time point of the update period corresponding to the designated group, the update server 200 may transmit the new version information to the electronic device 100.

After transmitting the new version information, the update server 200 may receive an update request of the application from the electronic device 100 in step 1425.

In step 1430, the update server may transmit application data corresponding to the new version information to the electronic device 100.

In step 1435, the update server 200 may record or updates the new version information as information on the application installed in the electronic device 100.

Figure 15:
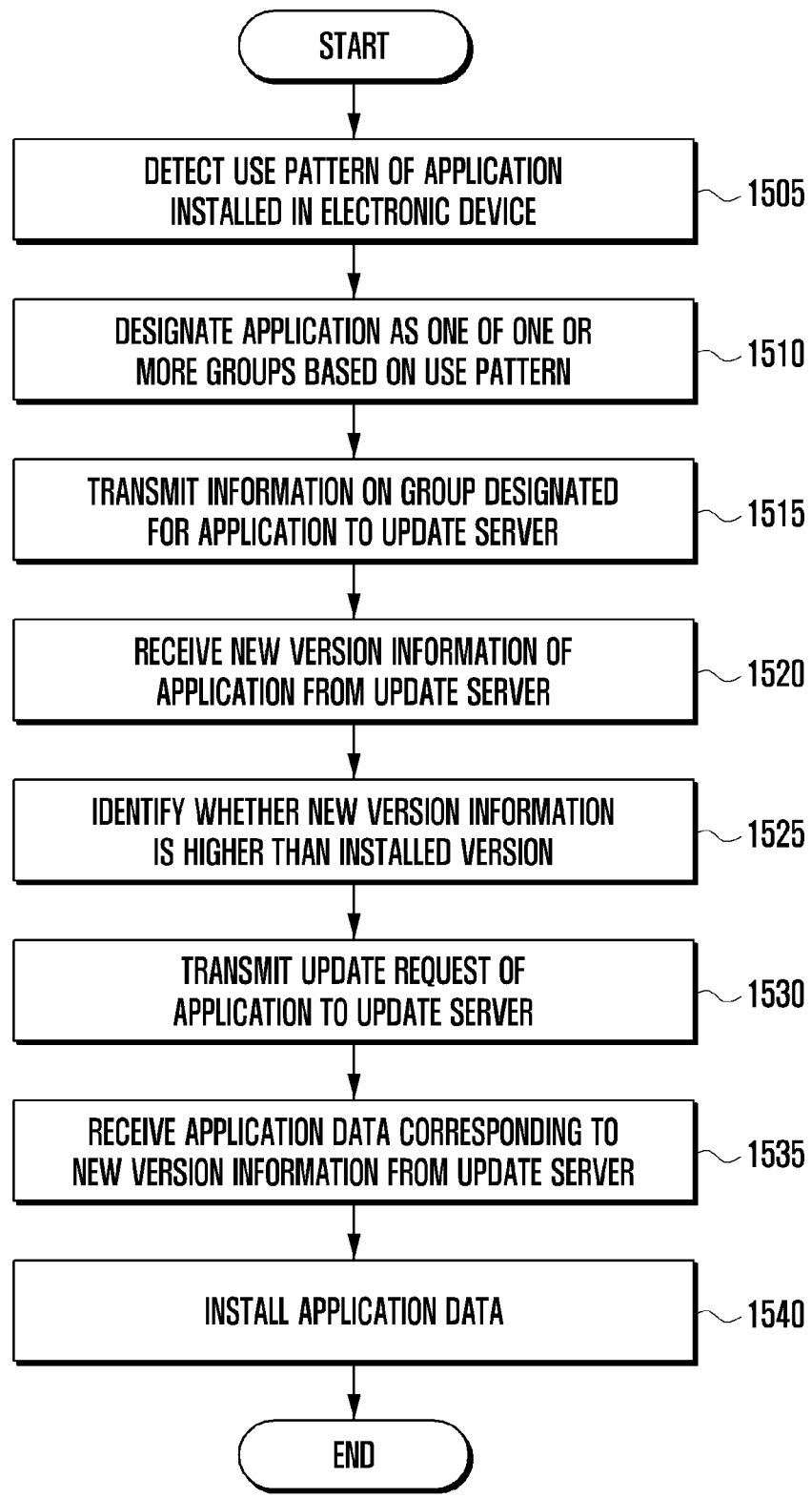
FIG. 15 is a flowchart illustrating the method of updating the application in the electronic device according to another embodiment of the present invention.

FIG. 15 is a flowchart illustrating the method of updating the application in the electronic device according to another embodiment of the present invention.

In step 1505, the electronic device 100 may detect a use pattern of the application installed in the electronic device 100.

In step 1510, the electronic device 100 may designate the application as one of the one or more groups based on the use pattern.

In step 1515, the electronic device 100 may transmit information on a group designated for the application to the update server 200. The information on the designated group may include identification information of the application, information on a group, or update period information. The update server 200 may manage one or more groups and stores information on applications included in each of the groups. Each of the groups corresponds to an update period.

In step 1520, the electronic device 100 may receive new version information of the application pushed from the update server 100. A time point when the new version information is pushed may be after a time point of the update period corresponding to the designated group.

In step 1525, the electronic device 100 may determine whether the level of the new version information is higher than a level version of an installed version.

When the level of the new version information is higher than the level of the installed version, the electronic device 100 may transmit an update request of the application to the update server 200 in step 1530.

In step 1535, the electronic device 100 may receive application data corresponding to the new version information from the update server 200.

In step 1540, the electronic device 100 may install the received application data.

Figure 16A:
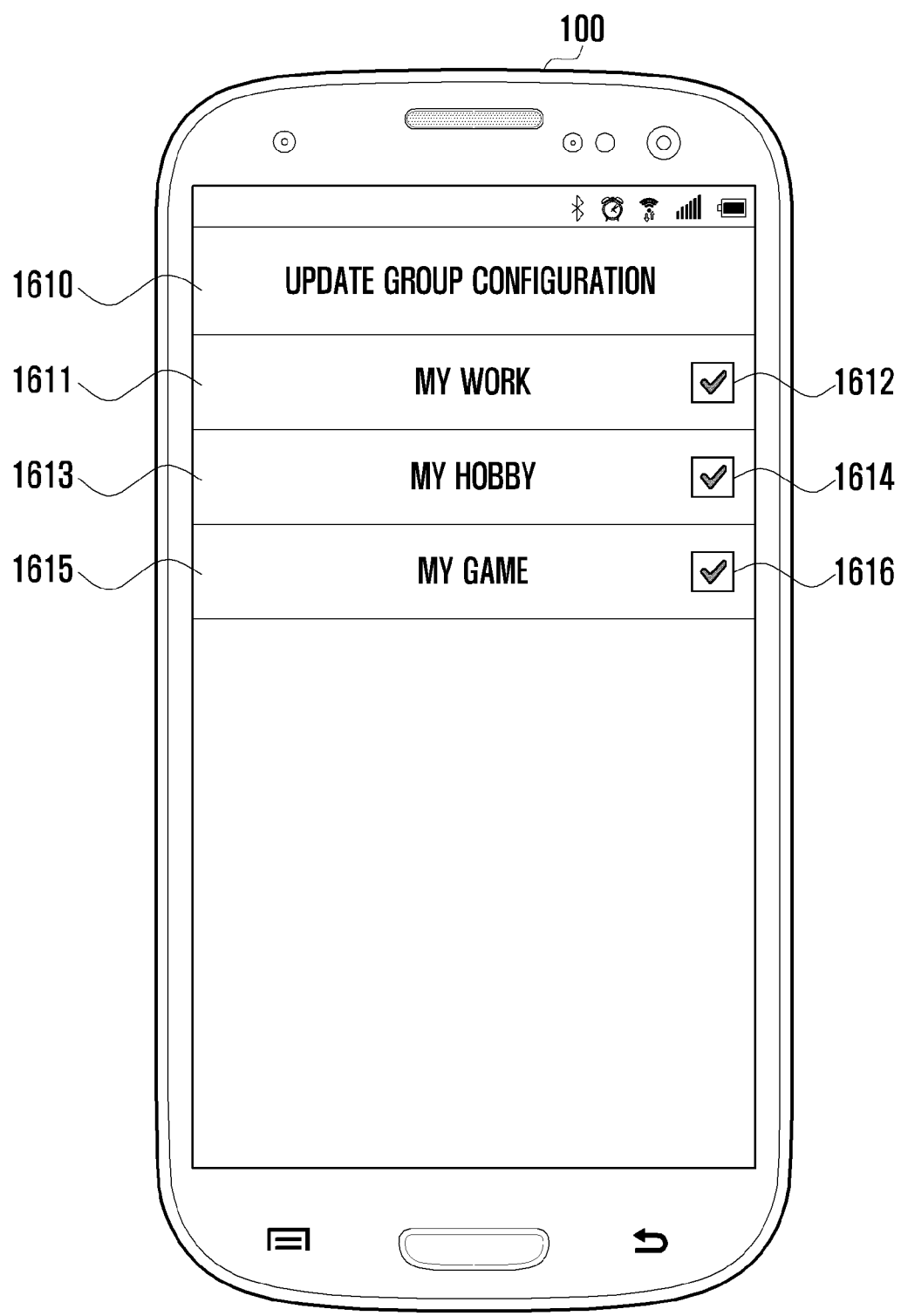
FIGS. 16A-16D illustrate examples of a user interface for manually configuring an application group in an electronic device according to another embodiment of the present invention.
Figure 16B:
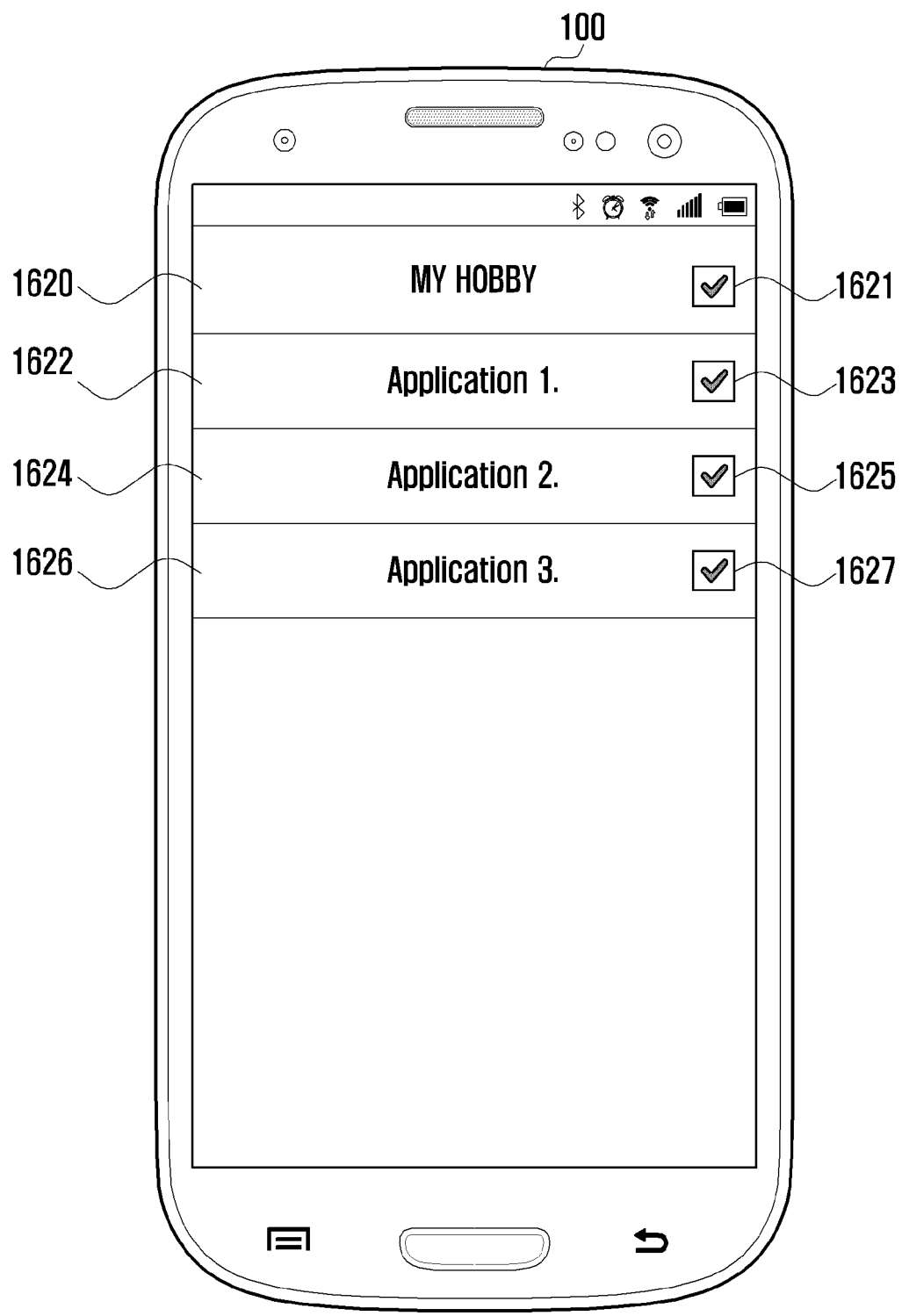

Referring to FIGS. 16A and 16B, in the electronic device 100 according to another embodiment of the present invention, the user may directly configure an application group by using an update configuration application and manually configure an update period of the configured application group.

Referring to FIG. 16A, the electronic device 100 may provide a user interface 1610 by which the user can directly configure an application group by using an update configuration application. The user may manually generate one or more application groups 1611, 1613, and 1615 on the user interface 160. Whether to insert the application groups 1611, 1613, and 1615 generated by the user into a group list may be displayed by interaction objects, for example, check boxes 1612, 1614, and 1616, a radio button and the like, or displayed in a manner designated according to an input by the user. As described above, with respect to an application included in the application group directly configured by the user, the controller 130 may not perform an operation for detecting a use pattern of the application.

Referring to FIG. 16B, when one update group 1613 is designated from the update groups directly configured by the user, the electronic device 100 may provide a user interface 1620 for configuring an application included in a designated application group by using an update configuration application. Further, whether to perform an automatic update on the corresponding application group may be displayed by interaction objects such as a check box 1621, a radio button and the like, or displayed in a manner designated according to an input by the user. The user may select one or more applications 1622, 1624, and 1626 included in the corresponding application group on the user interface 1620. Whether to insert the applications 1622, 1624, and 1626 selected by the user into the corresponding application group may be displayed by interaction objects, for example, check boxes 1623, 1625, and 1627, a radio button and the like, or displayed in a manner designated according to an input by the user.

Figure 16C:
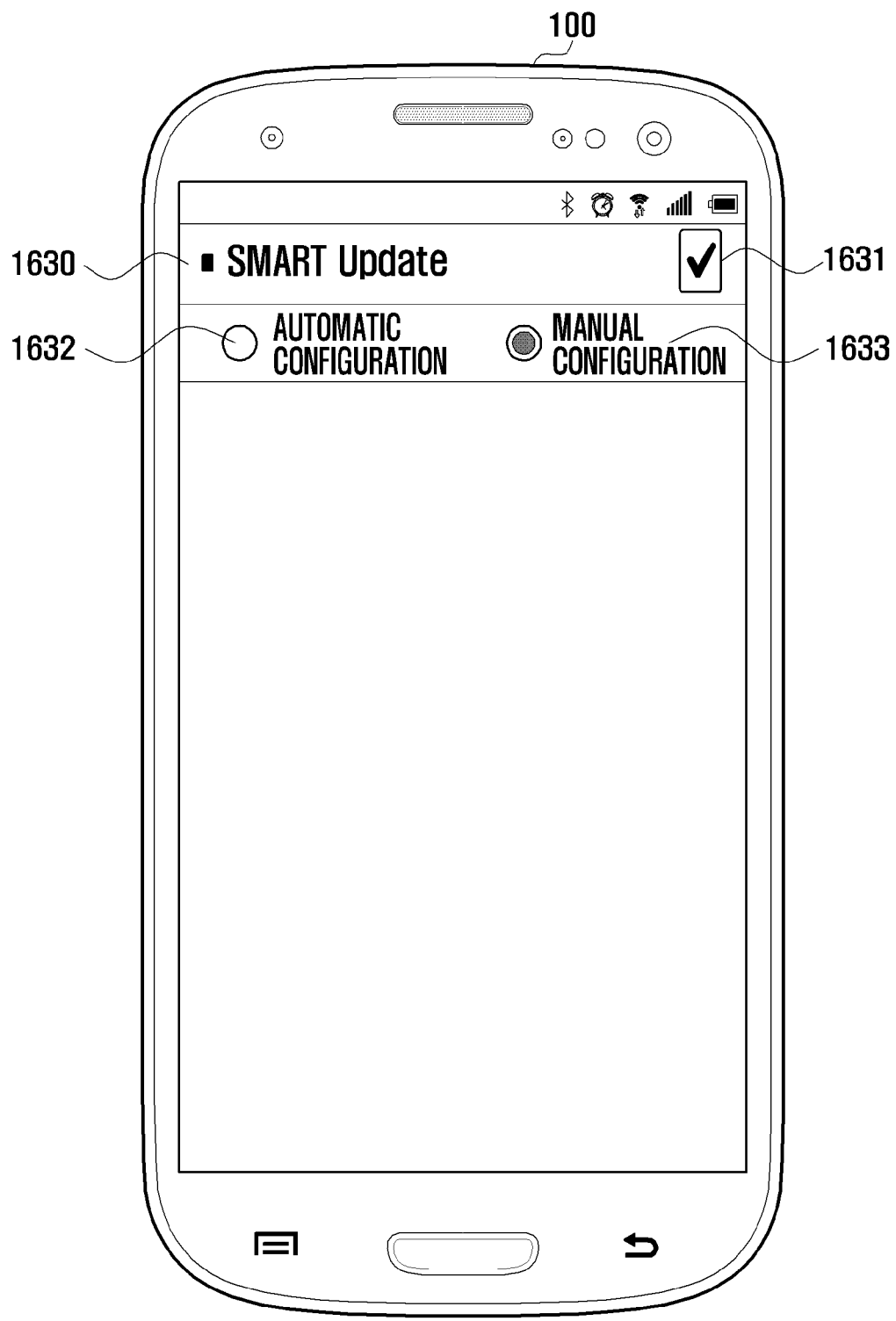

Referring to FIG. 16C, when an automatic update is configured for one update group 1613 of the update groups directly configured by the user, the electronic device 100 may provide a user interface 1630 which can make a configuration of whether to automatically or manually configure an application update period of the corresponding update group by using an update configuration application. In the automatic update, whether to perform the update in consideration of the period may be displayed by interaction objects such as a check box 1631, a radio button and the like, or displayed in a manner designated according to an input by the user. Further, the user interface 1630 may include an object for selecting an automatic configuration 1362 of the update period or a manual configuration 1633 by the user.

Figure 16D:
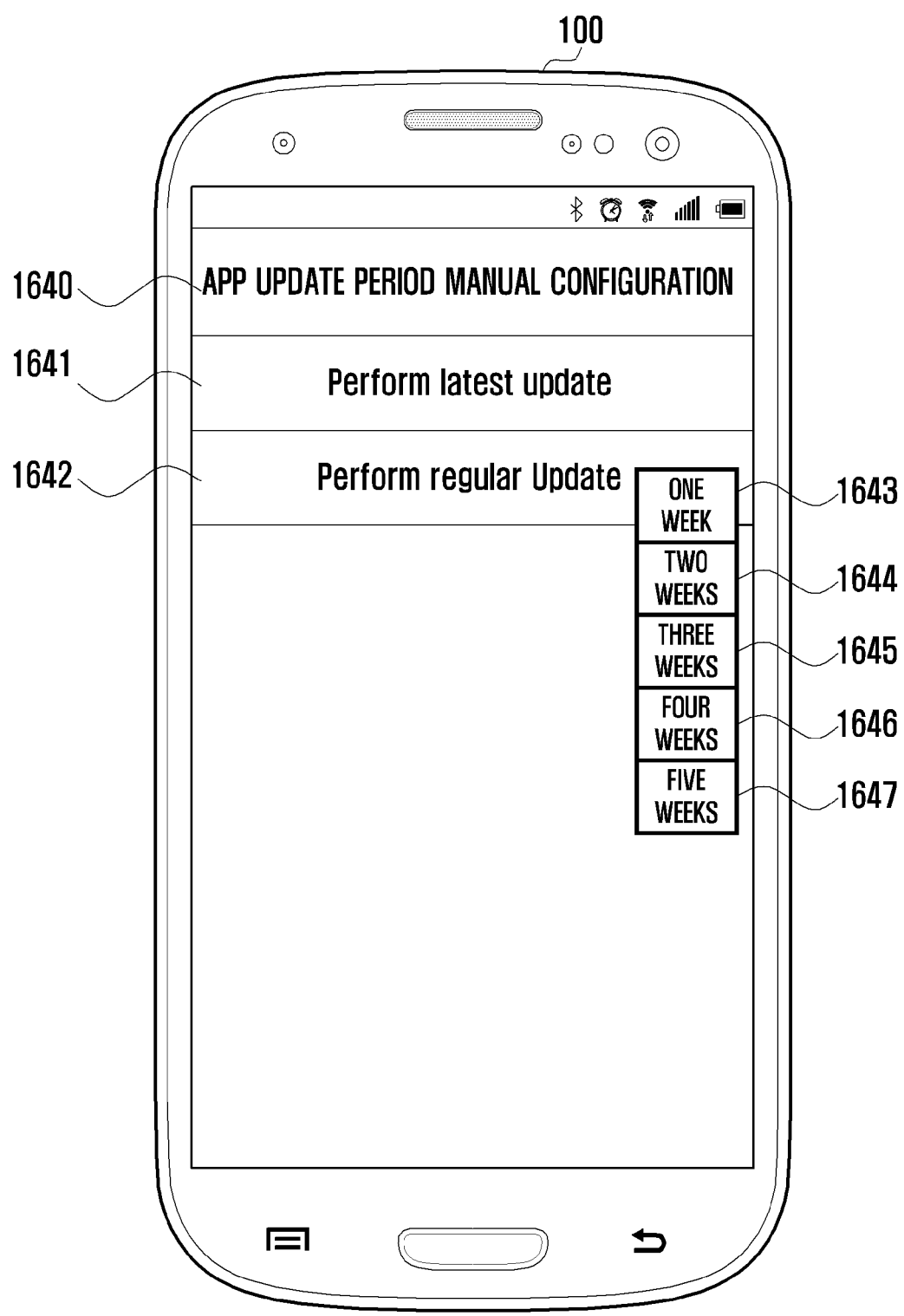

Referring to FIG. 16D, when the manual configuration 1633 is selected, the electronic device 100 may provide a user interface 1640 for an application update period manual configuration by using an update configuration application. For example, the user may make a designation of whether to allow the application to always perform a latest update 1641 or perform a regular update 1642 according to a configured period through the user interface 1640. When the regular update 1642 is designated, the user interface 1640 may display selectable update periods 1643, 1644, 1645, 1646, and 1647 to allow the user to select one and allow the user to receive an update period.

Figure 17A:
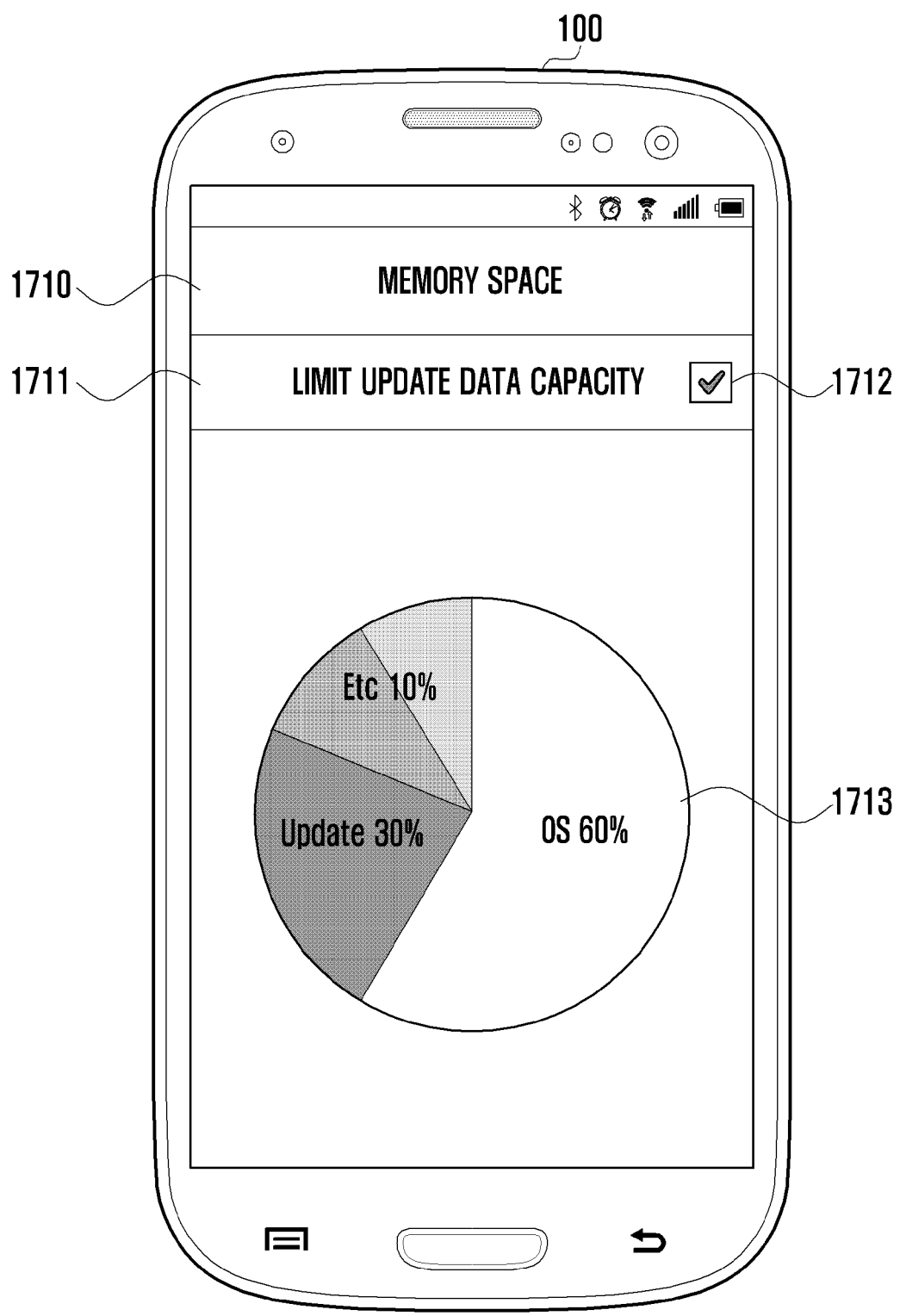
FIGS. 17A and 17B illustrate examples of a user interface for limiting a data capacity allocated to an application update in an electronic device according to another embodiment of the present invention.
Figure 17B:
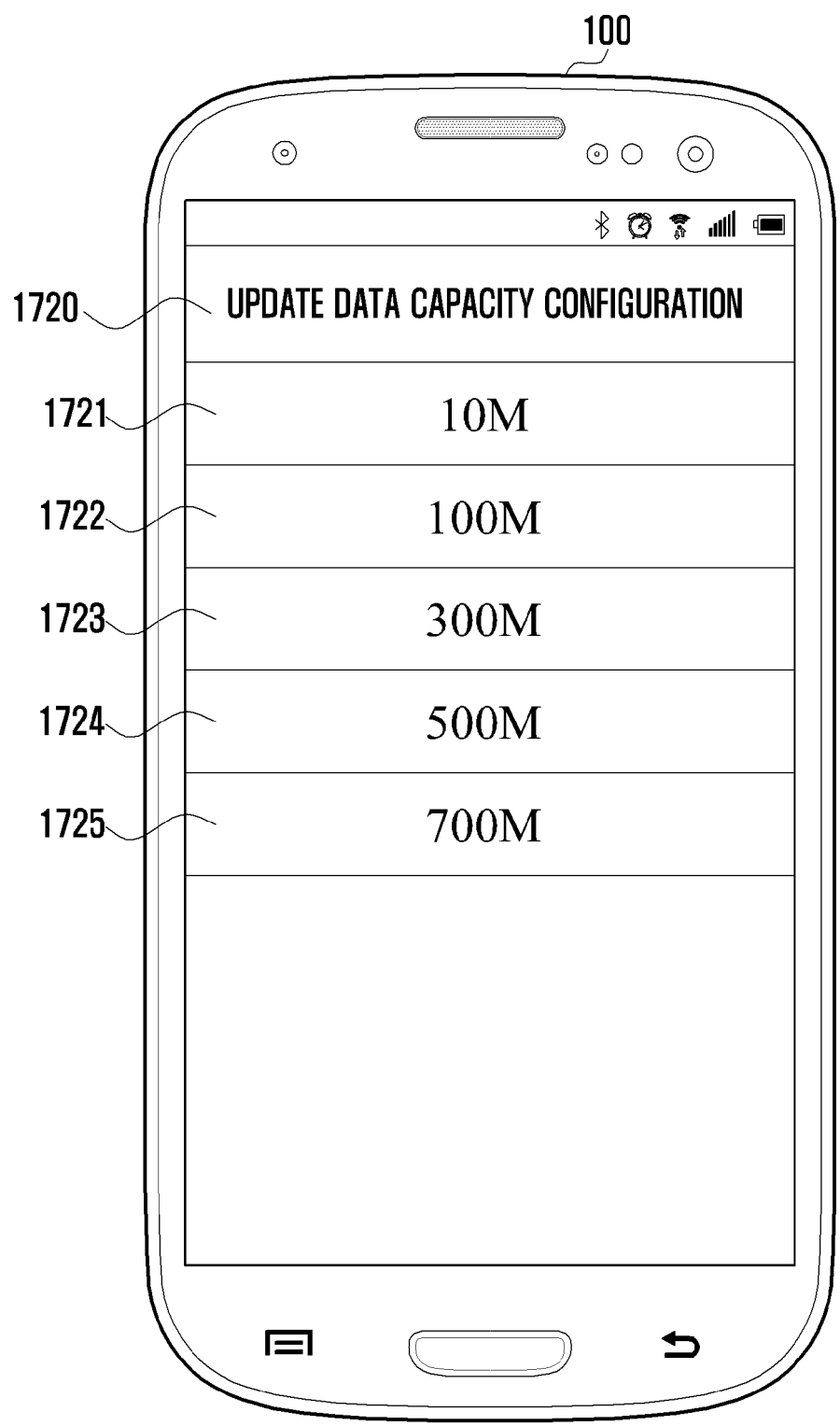

Referring to FIGS. 17A and 17B, the electronic device 100 according to another embodiment of the present invention may limit a data capacity allocated to an application update to a desired size by using an update configuration application. For example, when a manual update is configured, the electronic device 100 may limit the data capacity allocated to the application update in order to allow the user to intentionally determine whether to perform the update according to a memory space. The configuration of the manual update may be commonly applied to all application groups or applied to a designated application group. When the manual update configuration is applied to the designated application group, the user may actively control whether to perform the update in consideration of a memory space when updating the corresponding application group.

Referring to FIG. 17A, the electronic device 100 may provide a user interface 1711 which can select whether to limit a data capacity allocated to an application update by using an update configuration application. The user interface 1710 may provide an item 1711 for limiting the data capacity allocated to the update, and whether to limit the data capacity may be displayed by interaction objects such as a check box 1712, a radio button and the like, or displayed in a manner designated according to an input by the user. The user interface 1711 may provide the user with a currently allocated memory space 1713 to allow the user to determine whether to limit the data capacity allocated to the update with reference to the provided memory space 1713.

Referring to FIG. 17B, when the limit on the data capacity allocated to the update is designated, the electronic device 100 may provide a user interface 1720 for configuring the data capacity allocated to the application update by using an update configuration application. The user may designate data capacities 1721, 1722, 1723, 1724, and 1725 allocated to the application update on the user interface 1720. Alternatively, the user may input a desired data capacity into the user interface 1720.

According to an embodiment, when the data capacity allocated to the update is exceeded while the application update is manually performed, the update configuration application may provide a notification thereof to the user through a sound, a vibration, or a message. In this case, the electronic device 100 may stop or end the application update automatically or according to a control of the user.

According to another embodiment, when the application update is manually performed and a size of a corresponding update file exceeds the remaining data capacity allocated to the update through the identification of the update file, the update configuration application may provide a notification thereof to the user through a sound, a vibration, or a message. In this case, the electronic device 100 may stop or end the application update automatically or according to a control of the user.

The user interface described with reference to FIGS. 7 to 10 may be randomly changed by a producer, a service provider, or a user, and various user interfaces may be provided according to convenience and use purposes.

Further, orders of operations described as the process or method of updating the application with reference to FIGS. 6A and 6B and FIGS. 11 to 15 may be randomly changed or some of the operations may be omitted. Further, the operations may be performed by complexly combining some of the above described embodiments. It can be understood by those skilled in the art that the user interface may be changed in various forms according to the change or the omission of the operations.

Further, it can be understood by those skilled in the art that programs in the embodiment described through FIG. 5 and FIGS. 11 to 17 may be implemented by software, hardware, or a combination thereof. In addition, the program according to the embodiment may be recorded in a recording medium or may be downloaded to the electronic device or the update server from a server or a computer through a communication network.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of updating an application by an electronic device, the method comprising:
    activating an automatic update of an application installed in the electronic device;
    designating the application as one group of a plurality of groups based on at least one of a use frequency of the application and a use time of the application, which are determined based on a user interaction, which includes one of whether the user approaches a screen of the electronic device and whether the user interacts with the electronic device, detected by a sensor of the electronic device, each group of the plurality of groups corresponding to a different recurring update period;
    receiving new version information of the application pushed from an update server;
    controlling an update schedule such that the application is updated after a time point by filtering an update request event generated in response to reception of the new version information; and
    postponing the automatic update of the application until the time point of the recurring update period corresponding to the designated group of the application and updating the application after the time point by transmitting the filtered update request of the application to the update server.

2. The method of claim 1, wherein designating the application as the one group comprises at least one of:
    detecting a use pattern of the application and designating the application as the one group of the plurality of groups based on the detected use pattern; and
    designating the application as the one group of the plurality of groups based on a user input,
    wherein the use pattern indicates at least one of the use frequency of the application and the use time of the application.

3. The method of claim 1, wherein the recurring update period corresponding to the designated group can be changed through a user interface.

4. The method of claim 1, wherein updating the application comprises updating the application when an update condition is satisfied after the time point.

5. The method of claim 4, wherein the update condition is at least one of a state where the electronic device is connected through WiFi, a state where the electronic device is being charged, a state where the electronic device is connected to a designated access point, and a state where the electronic device enters a designated time zone, and a state where the electronic device enters a time zone and the electronic device is not used for a long time.

6. The method of claim 1, wherein designating the application as the one group comprises:
driving a timer for identifying an update time point of the application,
wherein the timer expires when the timer has a value equal to the recurring update period corresponding to the designated group, and the time point of the recurring update period corresponding to the designated group is a time point when the timer expires.

7. The method of claim 1, wherein updating the application comprises:
transmitting a version information request of the application to an update server after the time point of the recurring update period corresponding to the designated group; and
receiving version information of the application from the update server.

8. The method of claim 1, further comprising:
activating a manual update of the application installed in the electronic device;
limiting a data capacity allocated to the manual application update to a predetermined capacity in a memory of the electronic device;
updating the application based on a user's command; and
providing a notification when the data capacity allocated to the manual application update is exceeded during the manual application update based on the user's command or when an update file exceeds a remaining update allocation space.

9. An electronic device updating an application, the electronic device comprising:
memory for storing an application designated as one group of a plurality of groups based on at least one of a use frequency of the application and a use time of the application, which are determined based on a user interaction, which includes one of whether the user approaches a screen of the electronic device and whether the user interacts with the electronic device, detected by a sensor of the electronic device, each group of the plurality of groups corresponding to a different recurring update period;
a communication unit configured to receive new version information of the application pushed from an update server, and to transmit an update request of the application to the update server; and
a controller configured to control to activate an automatic update of the application, to control to filter the update request generated in response to reception of the new version information, and to control to transmit the filtered update request after a time point of the recurring update period corresponding to the designated group of the application, in response to receiving the new version information.

10. The electronic device of claim 9, wherein the controller detects a use pattern of the application and designates the application as the one group of the plurality of groups based on the detected use pattern or based on a user input, and
wherein the use pattern indicates at least one of the use frequency of the application and the use time of the application.

11. The electronic device of claim 9, wherein the recurring update period corresponding to the designated group can be changed through a user interface.

12. The electronic device of claim 9, wherein the controller is configured to control to transmit the update request when an update condition is satisfied after the time point.

13. The electronic device of claim 12, wherein the update condition is at least one of a state where the electronic device is connected through WiFi, a state where the electronic device is being charged, a state where the electronic device is connected to a designated access point, and a state where the electronic device enters a designated time zone, and a state where the electronic device enters a time zone and the electronic device is not used for a long time.

14. The electronic device of claim 9, wherein the controller is configured to drive a timer for identifying an update time point of the application when the application is designated as the one group of the plurality of groups, the timer expires when the timer has a value equal to the recurring update period corresponding to the designated group, and the time point of the recurring update period corresponding to the designated group is a time point when the timer expires.

15. The electronic device of claim 9, wherein, before the time point of the recurring update period corresponding to the designated group, the controller is configured to control an update schedule such that the application is updated after the time point by filtering an update request event generated in response to reception of the new version information.

16. The electronic device of claim 9, wherein the controller is configured to activate a manual update of the application installed in the electronic device, limit a data capacity allocated to the manual application update to a predetermined capacity in the memory of the electronic device, and, when the application is updated based on a user's command, providing a notification if the data capacity allocated to the manual application update is exceeded during the manual application update based on the user's command or an update file exceeds a remaining update allocation space.

17. A method of updating an application by an electronic device, the method comprising:
identifying at least one of a use frequency of an application installed in the electronic device and a use time of the application, which are determined based on a user interaction, which includes one of whether the user approaches a screen of the electronic device and whether the user interacts with the electronic device, detected by a sensor of the electronic device;
designating a recurring update period of the application based on at least one of the use frequency of the application and the use time of the application;
receiving new version information of the application pushed from an update server;
controlling an update schedule such that the application is updated until a time point of the designated recurring update period by filtering an update request generated in response to reception of the new version information; and
transmitting the filtered update request of the application to the update server until the time point of the designated recurring update period, in response to reception of the new version information.

18. An electronic device updating an application, the electronic device comprising:
a memory for storing a recurring update period of the application;

a communication unit configured to receive new version information of the application pushed from an update server; and controller configured to designate the recurring update period based on at least one of a use frequency of the application and a use time of the application, which are determined based on a user interaction, which includes one of whether the user approaches a screen of the electronic device and whether the user interacts with the electronic device, detected by a sensor of the electronic device, to control to filter the update request generated in response to reception of the new version information, and to control to transmit the filtered update request of the application to the update server after a time point of the recurring update period, in response to receiving the new version information.

* * * * *